US012695551B2

(12) United States Patent
Lin

(10) Patent No.: US 12,695,551 B2
(45) Date of Patent: Jul. 28, 2026

(54) METHOD AND APPARATUS FOR NACK-ONLY REPORTING IN RRC IDLE AND INACTIVE STATES

(71) Applicant: GUANGDONG OPPO MOBILE TELECOMMUNICATIONS CORP., LTD., Guangdong (CN)

(72) Inventor: Huei-Ming Lin, Taiwan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 636 days.

(21) Appl. No.: 17/878,078

(22) Filed: Aug. 1, 2022

(65) Prior Publication Data

US 2022/0368471 A1     Nov. 17, 2022

Related U.S. Application Data

(63) Continuation of application No. PCT/CN2021/075352, filed on Feb. 4, 2021.
(Continued)

(51) Int. Cl.
*H04L 1/1829* (2023.01)

(52) U.S. Cl.
CPC .......... *H04L 1/1861* (2013.01); *H04L 1/1854* (2013.01)

(58) Field of Classification Search
CPC ........................... H04L 1/1854; H04L 1/1861
See application file for complete search history.

(56) References Cited

U.S. PATENT DOCUMENTS 10,893,509 B2 * 1/2021 Mallik ................. H04L 1/1896
11,012,846 B2 * 5/2021 Lee ........................ H04W 68/00
(Continued)

FOREIGN PATENT DOCUMENTS

BR     112012024897 B1 *   9/2022   ............. H01Q 1/246
CN          109560898           4/2019
(Continued)

OTHER PUBLICATIONS

"International Search Report (Form PCT/ISA/210) of PCT/CN2021/075352," mailed on Apr. 29, 2021, pp. 1-2.
(Continued)

*Primary Examiner* — Iqbal Zaidi
*Assistant Examiner* — Andrew Shaji Kurian
(74) *Attorney, Agent, or Firm* — Hodgson Russ LLP

(57) ABSTRACT
Methods and apparatus for negative acknowledgement (NACK)-only reporting in radio resource control (RRC) idle and inactive states are provided. A method implemented by a user equipment (UE) comprising: receiving, from a serving node and via a new radio (NR) radio access network (RAN), at least one physical downlink shared channel (PDSCH) transport block; determining that a first PDSCH transport block is decoded erroneously during a UE RRC idle state or a UE RRC inactive state; generating a hybrid automatic repeat request (HARQ) information report indicating NACK of the first PDSCH transport block; and performing NACK-only reporting to the serving node. When a second PDSCH transport block is decoded correctly or is not decoded, UE determines not generating a HARQ information report indicating an acknowledgement (ACK) of the second PDSCH transport block.

19 Claims, 11 Drawing Sheets

300A

Related U.S. Application Data

(60) Provisional application No. 62/971,381, filed on Feb. 7, 2020.

(56) References Cited

U.S. PATENT DOCUMENTS

| | | | | |
|---|---|---|---|---|
| 12,057,892 | B2 * | 8/2024 | Chervyakov | H04W 24/06 |
| 12,088,394 | B2 * | 9/2024 | Enescu | H04W 72/046 |
| 12,089,281 | B2 * | 9/2024 | Fujishiro | H04W 76/27 |
| 2012/0281647 | A1 | 11/2012 | Kuo et al. | |
| 2015/0009972 | A1 * | 1/2015 | Xu | H04L 1/1854 |
| | | | | 370/336 |
| 2018/0115430 | A1 | 4/2018 | Seo | |
| 2019/0297502 | A1 * | 9/2019 | Jo | H04W 88/023 |
| 2019/0394823 | A1 * | 12/2019 | Jo | B60W 50/14 |
| 2020/0396760 | A1 * | 12/2020 | Yi | H04W 72/23 |
| 2022/0109546 | A1 * | 4/2022 | Panteleev | H04L 5/0053 |
| 2022/0174648 | A1 * | 6/2022 | Dong | H04W 72/0453 |
| 2022/0174666 | A1 * | 6/2022 | Kou | H04L 5/0078 |
| 2022/0201654 | A1 * | 6/2022 | Lee | H04L 5/0053 |
| 2022/0264533 | A1 * | 8/2022 | Zhang | H04L 1/1812 |
| 2022/0311552 | A1 * | 9/2022 | Kini | H04L 1/1864 |
| 2022/0353720 | A1 * | 11/2022 | Nader | H04W 36/0058 |
| 2022/0394702 | A1 * | 12/2022 | Lee | H04L 5/0069 |
| 2023/0044542 | A1 * | 2/2023 | Yao | H04W 72/30 |
| 2024/0283573 | A1 * | 8/2024 | Selvanesan | H04L 5/0053 |
| 2024/0357702 | A1 * | 10/2024 | Park | H04W 76/14 |
| 2025/0105983 | A1 * | 3/2025 | Liu | H04L 1/1864 |

FOREIGN PATENT DOCUMENTS

| | | | | |
|---|---|---|---|---|
| WO | WO-2015048361 | A1 * | 4/2015 | H04L 1/1671 |
| WO | 2016126653 | | 8/2016 | |
| WO | 2017031646 | | 3/2017 | |
| WO | WO-2020252174 | A1 * | 12/2020 | H04W 72/23 |

OTHER PUBLICATIONS

"Written Opinion of the International Searching Authority (Form PCT/ISA/237) of PCT/CN2021/075352," mailed on Apr. 29, 2021, pp. 1-4.

ZTE, Sanechips, "Consideration on HARQ feedback for groupcast," 3GPP TSG RAN WG2 Meeting #106 R2-1906481, May 2019, pp. 1-3.

"Search Report of Europe Counterpart Application, Application No. 21750315.0", issued on May 11, 2023, p. 1-p. 11.

Apple, "PC5 RRC Procedure Support", 3GPP TSG-RAN WG2 Meeting #106 R2-1906774, May 2019, pp. 1-4.

* cited by examiner

200

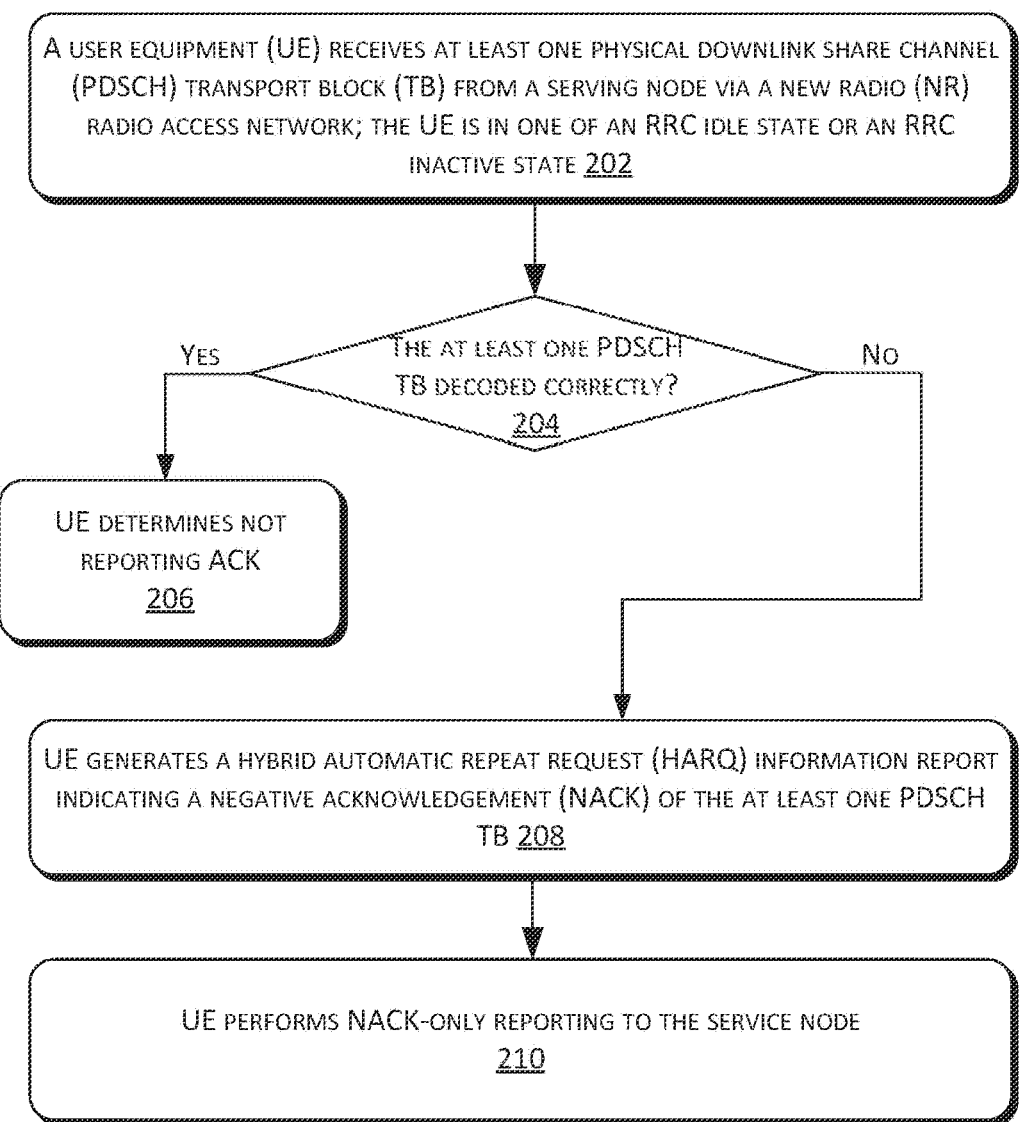

A USER EQUIPMENT (UE) RECEIVES AT LEAST ONE PHYSICAL DOWNLINK SHARE CHANNEL (PDSCH) TRANSPORT BLOCK (TB) FROM A SERVING NODE VIA A NEW RADIO (NR) RADIO ACCESS NETWORK; THE UE IS IN ONE OF AN RRC IDLE STATE OR AN RRC INACTIVE STATE 202

THE AT LEAST ONE PDSCH TB DECODED CORRECTLY? 204

YES

NO

UE DETERMINES NOT REPORTING ACK 206

UE GENERATES A HYBRID AUTOMATIC REPEAT REQUEST (HARQ) INFORMATION REPORT INDICATING A NEGATIVE ACKNOWLEDGEMENT (NACK) OF THE AT LEAST ONE PDSCH TB 208

UE PERFORMS NACK-ONLY REPORTING TO THE SERVICE NODE 210

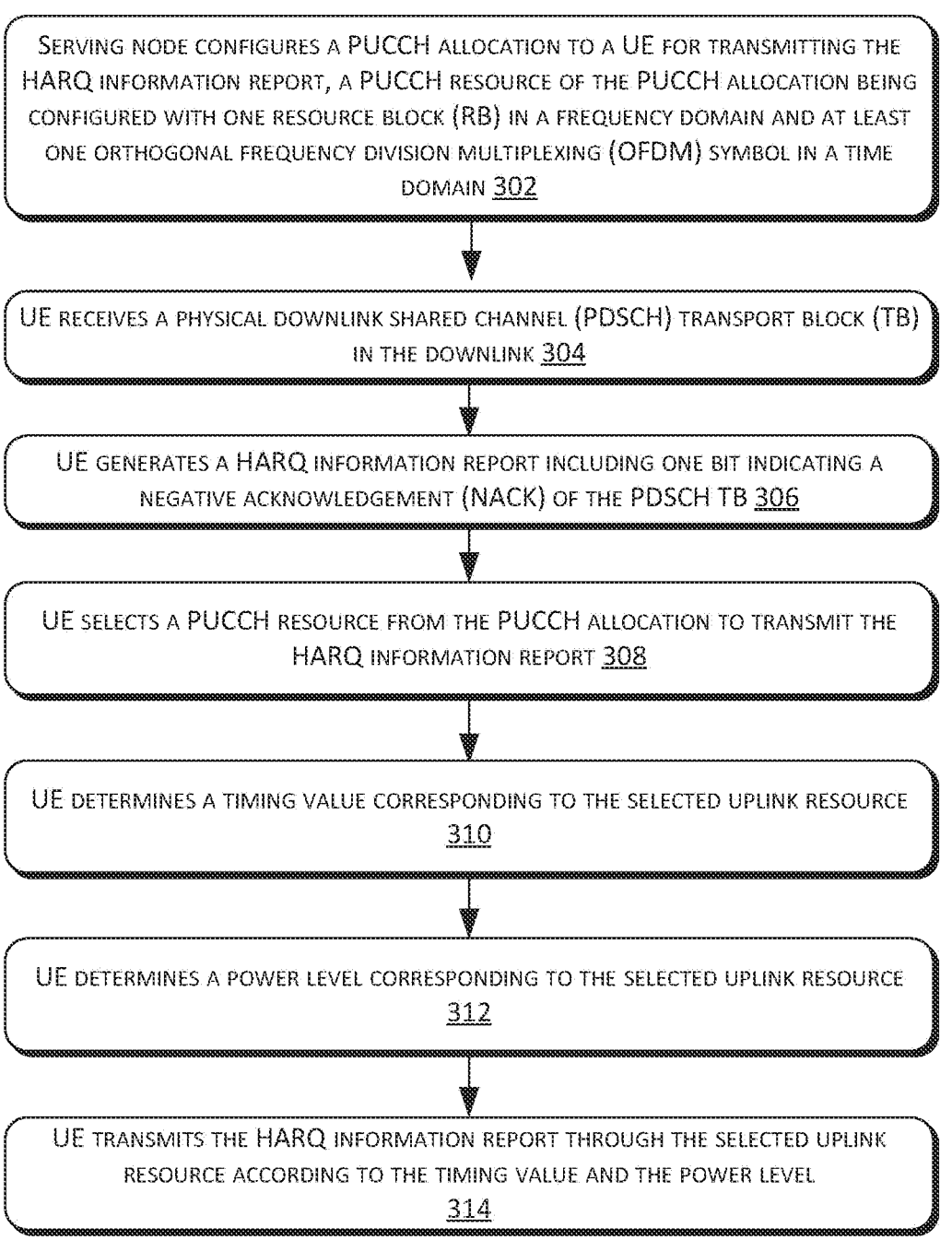

SERVING NODE CONFIGURES A PUCCH ALLOCATION TO A UE FOR TRANSMITTING THE HARQ INFORMATION REPORT, A PUCCH RESOURCE OF THE PUCCH ALLOCATION BEING CONFIGURED WITH ONE RESOURCE BLOCK (RB) IN A FREQUENCY DOMAIN AND AT LEAST ONE ORTHOGONAL FREQUENCY DIVISION MULTIPLEXING (OFDM) SYMBOL IN A TIME DOMAIN 302

UE RECEIVES A PHYSICAL DOWNLINK SHARED CHANNEL (PDSCH) TRANSPORT BLOCK (TB) IN THE DOWNLINK 304

UE GENERATES A HARQ INFORMATION REPORT INCLUDING ONE BIT INDICATING A NEGATIVE ACKNOWLEDGEMENT (NACK) OF THE PDSCH TB 306

UE SELECTS A PUCCH RESOURCE FROM THE PUCCH ALLOCATION TO TRANSMIT THE HARQ INFORMATION REPORT 308

UE DETERMINES A TIMING VALUE CORRESPONDING TO THE SELECTED UPLINK RESOURCE 310

UE DETERMINES A POWER LEVEL CORRESPONDING TO THE SELECTED UPLINK RESOURCE 312

UE TRANSMITS THE HARQ INFORMATION REPORT THROUGH THE SELECTED UPLINK RESOURCE ACCORDING TO THE TIMING VALUE AND THE POWER LEVEL 314

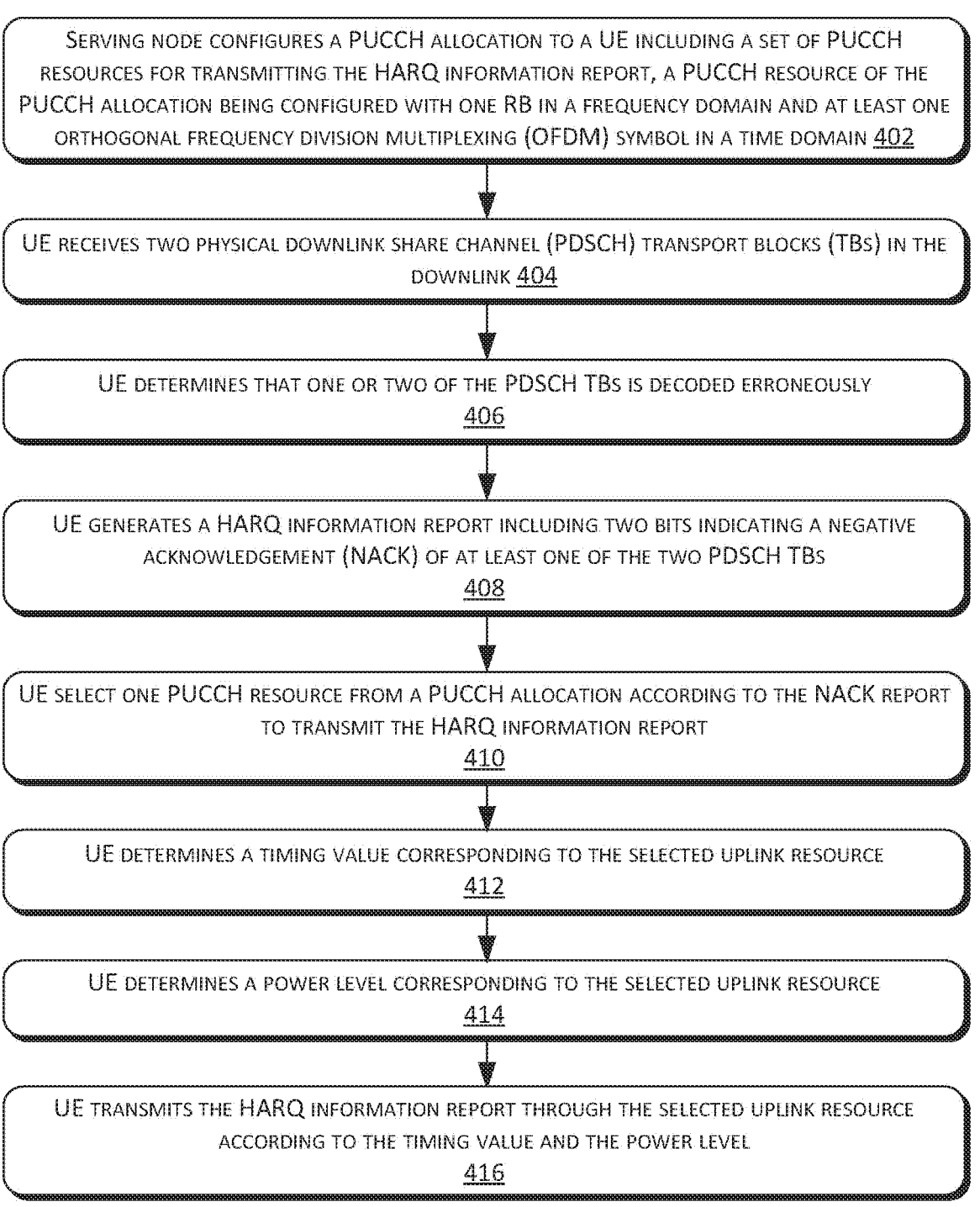

SERVING NODE CONFIGURES A PUCCH ALLOCATION TO A UE INCLUDING A SET OF PUCCH RESOURCES FOR TRANSMITTING THE HARQ INFORMATION REPORT, A PUCCH RESOURCE OF THE PUCCH ALLOCATION BEING CONFIGURED WITH ONE RB IN A FREQUENCY DOMAIN AND AT LEAST ONE ORTHOGONAL FREQUENCY DIVISION MULTIPLEXING (OFDM) SYMBOL IN A TIME DOMAIN 402

UE RECEIVES TWO PHYSICAL DOWNLINK SHARE CHANNEL (PDSCH) TRANSPORT BLOCKS (TBs) IN THE DOWNLINK 404

UE DETERMINES THAT ONE OR TWO OF THE PDSCH TBs IS DECODED ERRONEOUSLY 406

UE GENERATES A HARQ INFORMATION REPORT INCLUDING TWO BITS INDICATING A NEGATIVE ACKNOWLEDGEMENT (NACK) OF AT LEAST ONE OF THE TWO PDSCH TBs 408

UE SELECT ONE PUCCH RESOURCE FROM A PUCCH ALLOCATION ACCORDING TO THE NACK REPORT TO TRANSMIT THE HARQ INFORMATION REPORT 410

UE DETERMINES A TIMING VALUE CORRESPONDING TO THE SELECTED UPLINK RESOURCE 412

UE DETERMINES A POWER LEVEL CORRESPONDING TO THE SELECTED UPLINK RESOURCE 414

UE TRANSMITS THE HARQ INFORMATION REPORT THROUGH THE SELECTED UPLINK RESOURCE ACCORDING TO THE TIMING VALUE AND THE POWER LEVEL 416

COMB-STRUCTURED
MAPPING (A)

COMB-STRUCTURED
MAPPING (B)

500B

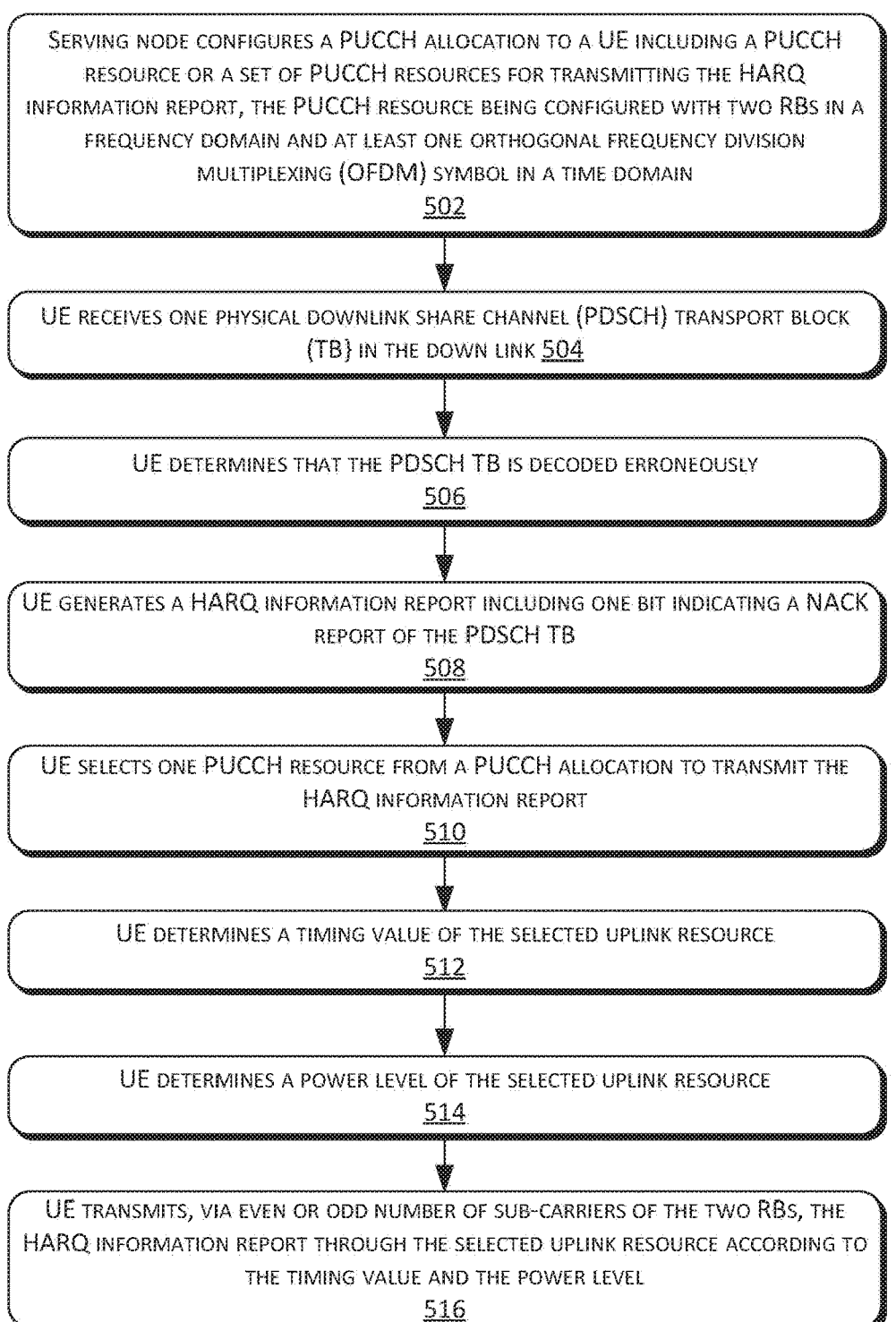

SERVING NODE CONFIGURES A PUCCH ALLOCATION TO A UE INCLUDING A PUCCH RESOURCE OR A SET OF PUCCH RESOURCES FOR TRANSMITTING THE HARQ INFORMATION REPORT, THE PUCCH RESOURCE BEING CONFIGURED WITH TWO RBS IN A FREQUENCY DOMAIN AND AT LEAST ONE ORTHOGONAL FREQUENCY DIVISION MULTIPLEXING (OFDM) SYMBOL IN A TIME DOMAIN
502

UE RECEIVES ONE PHYSICAL DOWNLINK SHARE CHANNEL (PDSCH) TRANSPORT BLOCK (TB) IN THE DOWN LINK 504

UE DETERMINES THAT THE PDSCH TB IS DECODED ERRONEOUSLY
506

UE GENERATES A HARQ INFORMATION REPORT INCLUDING ONE BIT INDICATING A NACK REPORT OF THE PDSCH TB
508

UE SELECTS ONE PUCCH RESOURCE FROM A PUCCH ALLOCATION TO TRANSMIT THE HARQ INFORMATION REPORT
510

UE DETERMINES A TIMING VALUE OF THE SELECTED UPLINK RESOURCE
512

UE DETERMINES A POWER LEVEL OF THE SELECTED UPLINK RESOURCE
514

UE TRANSMITS, VIA EVEN OR ODD NUMBER OF SUB-CARRIERS OF THE TWO RBS, THE HARQ INFORMATION REPORT THROUGH THE SELECTED UPLINK RESOURCE ACCORDING TO THE TIMING VALUE AND THE POWER LEVEL
516

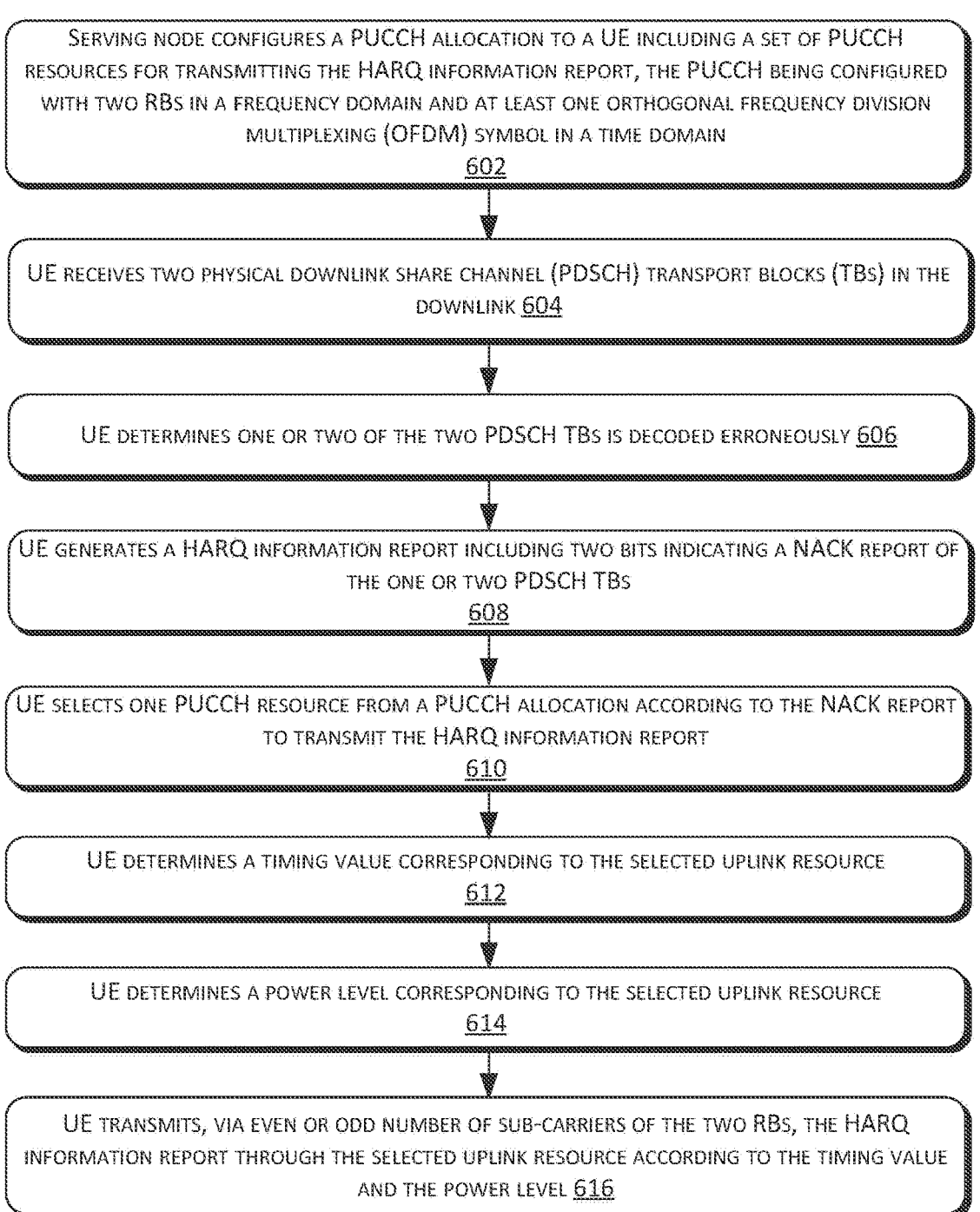

SERVING NODE CONFIGURES A PUCCH ALLOCATION TO A UE INCLUDING A SET OF PUCCH RESOURCES FOR TRANSMITTING THE HARQ INFORMATION REPORT, THE PUCCH BEING CONFIGURED WITH TWO RBs IN A FREQUENCY DOMAIN AND AT LEAST ONE ORTHOGONAL FREQUENCY DIVISION MULTIPLEXING (OFDM) SYMBOL IN A TIME DOMAIN
602

UE RECEIVES TWO PHYSICAL DOWNLINK SHARE CHANNEL (PDSCH) TRANSPORT BLOCKS (TBs) IN THE DOWNLINK 604

UE DETERMINES ONE OR TWO OF THE TWO PDSCH TBs IS DECODED ERRONEOUSLY 606

UE GENERATES A HARQ INFORMATION REPORT INCLUDING TWO BITS INDICATING A NACK REPORT OF THE ONE OR TWO PDSCH TBs
608

UE SELECTS ONE PUCCH RESOURCE FROM A PUCCH ALLOCATION ACCORDING TO THE NACK REPORT TO TRANSMIT THE HARQ INFORMATION REPORT
610

UE DETERMINES A TIMING VALUE CORRESPONDING TO THE SELECTED UPLINK RESOURCE
612

UE DETERMINES A POWER LEVEL CORRESPONDING TO THE SELECTED UPLINK RESOURCE
614

UE TRANSMITS, VIA EVEN OR ODD NUMBER OF SUB-CARRIERS OF THE TWO RBs, THE HARQ INFORMATION REPORT THROUGH THE SELECTED UPLINK RESOURCE ACCORDING TO THE TIMING VALUE AND THE POWER LEVEL 616

FIG. 6

METHOD AND APPARATUS FOR NACK-ONLY REPORTING IN RRC IDLE AND INACTIVE STATES

CROSS-REFERENCE TO RELATED APPLICATION

This application is a continuation of international application of PCT application serial no. PCT/CN2021/075352 filed on Feb. 4, 2021, which claims the priority benefit of U.S. provisional application No. 62/971,381 filed on Feb. 7, 2020. The entirety of each of the above mentioned patent applications is hereby incorporated by reference herein and made a part of this specification.

BACKGROUND

In cellular networks according to standards of the Third Generation Partnership Project (3GPP), most common communication specifications are based on point-to-point communication, while point-to-multipoint communication specifications, including multicast and broadcast, remain uncommonly proposed and implemented. Likewise, to date, most drafts of the fifth generation New Radio (5G-NR) radio access technology (RAT) specification have focused on point-to-point over point-to-multipoint communications. However, new 3GPP proposals include specifications for implementing radio transceiver functions which support multicast and broadcast services in 5G-NR radio access networks (RANs).

Support of multicast and broadcast communications may enable a variety of applications, services, and user experience enhancements to be provided over 5G RAN infrastructure. Traditional broadcasting content, such as radio and television, may be transmitted to many user terminals wirelessly over 5G RANs. Information services, providing public safety advisories and mission-critical advisories, can also be operated over such infrastructure. Such multicast and broadcast communications are envisioned by many categories of technologies and proof-of-concepts, such as group communications, Internet of Things (IoT), internet protocol TV (IPTV), and vehicle-to-everything (V2X) communications.

However, in point-to-multipoint communications, user terminals may or may not be in a ready state at all times to receive data sent by multicast or broadcast. According to 5G-NR, user equipment (UE) may be in any of several defined radio resource control (RRC) states: idle, inactive, and connected. To support multicast and broadcast-based services, 5G RANs need to be configured to deliver service contents to user equipment (UE) in any of these RRC states. Current NR radio specifications, however, are not designed to reliably receive content outside of point-to-point communication, especially during RRC idle and inactive states.

For example, in any communication, packets may be lost during transmission, necessitating retransmission thereof. In accordance with physical channels for data transmission as currently specified, blind retransmissions are implemented, causing base stations to repeatedly transmit the same data without knowledge of whether the data was correctly received at terminals. Such blind retransmission may result in compounded poor downlink (DL) data reception performance and compounded packet latency delays if implemented in multicast or broadcast communication.

Furthermore, it is desired to adapt multicast and broadcast communications to increasingly large-scale applications, such as broadcasting road condition information to all vehicles on a busy highway; broadcasting emergency advisories to all persons in a geographical region; broadcasting audio and video to all event attendees in and near a stadium; and the like. In such applications, a single base station is no longer sufficient as the basis for point-to-multipoint communication.

For at least the above reasons, it is desired to improve DL data reception performance for UEs operating in RRC idle and inactive states.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 illustrates an example flowchart of a method of providing HARQ feedback in the 5G-NR cellular communication network according to some embodiments of the present disclosure.

FIG. 3C illustrates an example flowchart of a method of transmitting the HARQ feedback for NACK-only reporting according to some embodiments of the present disclosure.

FIG. 4B illustrates an example flowchart of a method of providing the HARQ feedback for NACK-only reporting according to some embodiments of the present disclosure.

FIG. 5B illustrates another example flowchart of a method of providing the HARQ feedback for NACK-only reporting according to some embodiments of the present disclosure.

FIG. 6 illustrates another example flowchart of a method of providing the HARQ feedback for NACK-only reporting according to some embodiments of the present disclosure.

DETAILED DESCRIPTION

Figure 1:
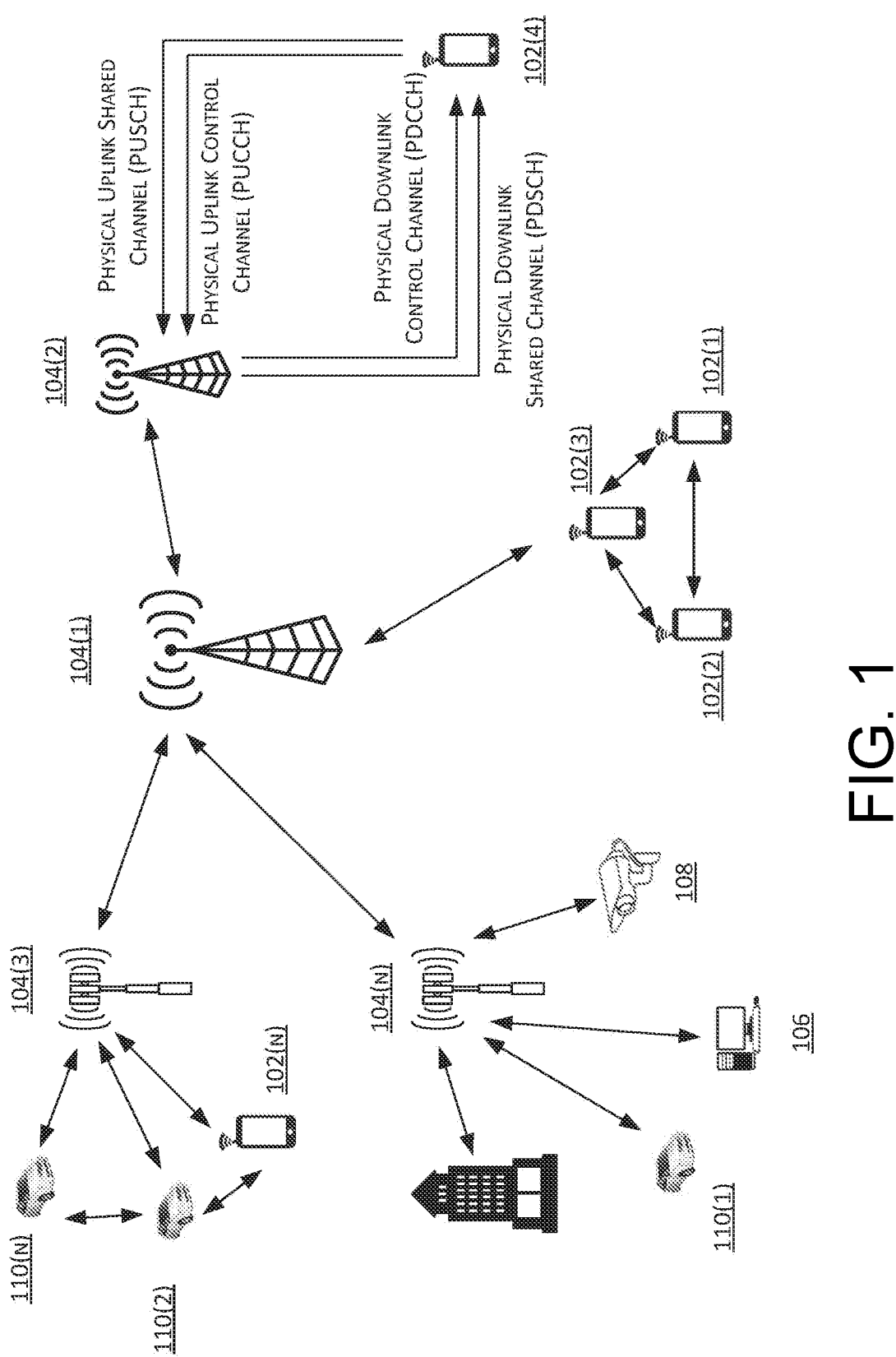
FIG. 1 illustrates an example architectural diagram of a fifth generation—new radio (5G-NR) cellular communication network according to some embodiments of the present disclosure.

Systems and methods discussed herein are directed to providing HARQ feedback in RRC idle and inactive states in an 5G-NR cellular communication network.

According to an aspect of the present disclosure, a method implemented by a user equipment (UE) may be implemented by: receiving, from a serving node and via a new radio (NR) radio access network (RAN), at least one physical downlink shared channel (PDSCH) transport block (TB); determining that a first PDSCH transport block is decoded erroneously during a UE radio resource control (RRC) idle state or a UE RRC inactive state; generating a hybrid automatic repeat request (HARQ) information report indicating a negative acknowledgement (NACK) of the first PDSCH transport block; and performing NACK-only reporting to the serving node. In one aspect of the present disclosure, when a PDSCH transport block is decoded correctly, the UE determines not generating a HARQ information report indicating an acknowledgement (ACK) of the PDSCH transport block.

According to one aspect of the present disclosure, the HARQ information report may include one bit to indicate a NACK report of one PDSCH TB received at the downlink. When the UE receives two PDSCH TBs at the downlink, the HARQ information report may include two bits to indicate a NACK report of two PDSCH TBs. The UE may select one of the PUCCH resource to transmit the HARQ information report based on random selection, based on the UE identifier, or based on an indication in downlink control information (DCI).

According to another aspect of the present disclosure, the serving node configures a physical uplink control channel (PUCCH) allocation to the UE, which may include one PUCCH resource or a set of PUCCH resources for transmitting the HARQ information report by the UE. The PUCCH allocation is configured by the serving node for individual UEs for HARQ feedback. In implementations, the PUCCH allocation may be provided from the serving node via a system information block and/or indicated in the downlink control information (DCI) in the downlink. HARQ information may be represented in a pseudo-random sequence format.

In one aspect of the present disclosure, the serving node may configure one or more resource blocks (RBs) for the PUCCH allocation. Orthogonal frequency-division multiplexing (OFDM) over the frequency domain of each of the one or more RBs to establish, according to example embodiments of the present disclosure, up to 12 mutually orthogonal sub-carriers in each of the one or more RBs, enabling as many signals as sub-carriers to be carried in the frequency band of each RB. The serving node may indicate to the UE in DCI one of the configured PUCCH resources which should be selected for HARQ information reporting, or the UE may select one of the configured PUCCH resources for HARQ information reporting based on random selection or based on at least a UE identifier.

When performing a NACK-only reporting, the UE generates a pseudo-random sequence and then may further perform some number of cyclic shifts upon the generated sequence, deriving a cyclic shift hopping pseudo-random sequence, mapping the generated or derived sequence to an RB corresponding to the indicated/selected PUCCH resource for transmission. According to example embodiments of the present disclosure, a cyclic shift hopping pseudo-random sequence should be understood as referring to any one among a set of possible sequences, each of equal length, the size of the set being equal to the length of each possible sequence, wherein each possible sequence includes the same pseudo-randomly generated elements in the same order, each possible sequence having a differently-offset cyclic shift applied to the elements therein. For brevity, any one sequence of a set of possible cyclic shift hopping pseudo-random sequences may be referred to herein as a "particular cyclic shift hopping pseudo-random sequence." Each sequence of a set of possible cyclic shift hopping pseudo-random sequences, beyond an initial sequence, is derived by performing cyclic shift hopping operations, each having a differently-offset cyclic shift, on the initial pseudo-random sequence. The set of possible cyclic shift hopping pseudo-random sequences are orthogonal to each other, and, therefore, can be code-division multiplexed (CDM'ed) with the allocated PUCCH resource in the same frequency RB.

In one aspect of the present disclosure, when a PUCCH resource is configured with two RBs, the UE generates a pseudo-random sequence and may further derive a cyclic shift hopping pseudo-random sequence therefrom, mapping the generated or derived sequence to odd-numbered or even-numbered sub-carriers of the two RBs configured in the allocated PUCCH resource.

According to another aspect of the present disclosure, the UE determines a timing offset/advanced (TA) value corresponding to the PUCCH resources. In one implementation, the UE determines the TA value based on the downlink reception timing. The UE derives the TA value according to the synchronization signal block (SSB) and PDSCH received in the downlink. According to another implementation, the UE determines the TA value based on a reference signal received power (RSRP) measurement for the downlink and according to a set of timing values. According to yet another implementation, the UE determines the TA value based on the latest TA value provided by the serving node during an RRC connected state. According to yet another implementation, the UE determines the TA value based on a global navigation satellite system (GNSS) timing and system frame or slot number or boundary.

According to another aspect of the present disclosure, the UE determines a power level corresponding to the PUCCH resources. In one implementation, the UE determines the power level based on a synchronization signal block (SSB) or a channel state information—reference signal (CSI-RS) and a transmitting power. The UE determines pathloss according to the transmitting power and the received power of the at least one of SSB or CSI-RS. Based on the pathloss and a target received power configured or indicated in downlink control information (DCI) by the serving node, the UE can determine the power level to transmit the HARQ information report. In another implementation, the UE determines the power level based on a reference signal received power (RSRP) measurement for the downlink and according to a set of power level values. According to yet another implementation, the UE determines the power level based on the latest power level provided by the serving node during an RRC connected state.

According to example embodiments of the present disclosure, "NACK-only reporting" should be understood as referring to the configuration of a UE so that the UE transmit HARQ information reports that indicate NACKs of physical downlink shared channel (PDSCH) transport blocks (TBs), and so that the UE does not transmit HARQ information reports that indicate ACKs of PDSCH TBs.

Example embodiments of the present disclosure improve DL data reception performance for UEs operating in RRC idle and inactive states by performing NACK-only reporting, i.e., transmitting a HARQ information report as feedback only when DL data packets are not decoded successfully. The methods according to the present disclosure help to reduce multicast and broadcast content delivery latency by retransmitting the same data packets to the UEs only when necessary, rather than performing blind retransmission. Further, by utilizing pseudo-random based sequences to represent the HARQ information report, NR cellular communication networks may allocate and configure a common or a set of common uplink (UL) resources to be shared among the NACK-only reporting UEs. The present disclosure greatly improves utilization efficiency of the UL resources, reduces UE processing and power consumption in the uplink feedback preparation, and simplifies HARQ feedback detection process at gNB base stations.

FIG. 1 illustrates an example architectural diagram 100 of a fifth generation—new radio (5G-NR) radio access network (RAN) according to some embodiments of the present disclosure.

5G-NR RANs (also referred to as "5G networks") initially operate in conjunction with existing 4G networks using a range of macro cells, small cells and dedicated in-building systems to provide coverage expansions with energy efficiency and less latency. A 5G-NR RAN may include one or more serving nodes 104(1), 104(2), 104(3), . . . , 104(n) (hereinafter referred to as "serving node"). The serving node may include any type of base stations operating in a cellular communication network including, but not limited to, Node B in universal mobile telecommunications system (UMTS), eNodeB or eNB in long term evolution (LTE) networks, gNodeB or gNB in 5G-NR networks, and the like. The serving node may be configured to provide voice and data services to the user equipment (UE) located within its serving area (also referred to as "cell" or "network cell"). UEs communicating over the 5G-NR RAN may be any type of electronic devices configured to communication with the serving node over wireless communication channels, for example, mobile devices 102(1), 102(2), 102(3), 102(4), . . . , 102(n), a desktop computer 106, a security device 108, vehicles 110(1), 110(2), . . . , 110(n), etc. It should be appreciated that the serving nodes and UEs as described are merely for illustration purposes. For example, other types of UE (not shown) may also include virtual reality (VR) devices, wearable devices, smart home devices, and the like; the present disclosure is not intended to be limiting thereto.

The serving node may transmit user data over a physical downlink shared channel (PDSCH) to UEs in the cell. In some circumstances, the PDSCH may also carry random access response messages when PDSCH is mapped to a random access channel (RACH). The PDSCH may apply adaptive modulation and coding (AMC) scheme to the user data carried thereon. The AMC scheme applied for individual PDSCH allocated to individual UE may be determined by the downlink control information (DCI). Over a physical downlink control channel (PDCCH), the serving node may transmit control information related to performing physical layer control functions, such as scheduling the downlink (DL) broadcast and DL/uplink (UL) unicast data transmission and signaling triggers for periodic and aperiodic transmission and reception. UEs may transmit user data to the serving node over a physical uplink shared channel (PUSCH). Uplink control information including channel quality info, acknowledgements, and scheduling requests may be carried in the physical uplink control channel (PUCCH).

FIG. 2 illustrates an example flowchart of a method 200 of providing HARQ feedback in the 5G-NR cellular communication network according to some embodiments of the present disclosure.

At step 202, a user equipment (UE) may receive at least one physical downlink shared channel (PDSCH) transport block (TB) from a serving node via an NR RAN, while the UE is in one of a radio resource control (RCC) idle state or an RCC inactive state. For example, as illustrated in FIG. 1, the UE may be any user equipment 102(n), 106(n), 108(n), or 110(n), or any other user equipment according to example embodiments of the present disclosure without limitation. The serving node may be a serving node 104 as illustrated in FIG. 1, or may be any other serving node according to example embodiments of the present disclosure without limitation. According to the present embodiment, during steps of the method 200, the UE is not in an RRC connected mode, but rather in an RRC idle mode where the UE does not have data to send to the serving node, or in an RRC inactive mode where the UE has no activity for a short period of time.

At step 204, the UE may determine whether the at least one PDSCH TB is decoded correctly. According to some embodiments, the UE may decode the user data transmitted over the PDSCH according to a low-density parity-check (LDPC) coding scheme. However, the UE may decode the user data according to any suitable coding scheme, for example, Turbo coding, tail-biting convolutional coding (TB-CC), Polar coding, etc.

Upon the UE determining that the at least one PDSCH TB is decoded correctly, at step 206, the UE may determine not reporting ACK indicating an acknowledgement of the at least one PDSCH TB. According to the present embodiment, an acknowledge of successful decoding of the at least one PDSCH TB (i.e., ACK) is not transmitted to the serving node when the UE is in RRC idle state or RRC inactive state.

Upon the UE determines that the at least one PDSCH TB is not decoded correctly, at step 208, the UE may generate a HARQ information report indicating a negative acknowledgement of the at least one PDSCH TB.

At step 210, the UE may perform NACK-only reporting to the serving node. NACK-only reporting, as described above, may include transmitting, to the serving node, the HARQ information report over a physical uplink control channel (PUCCH) resource. However, NACK-only reporting should also be understood as including the absence of a transmitting step following step 206 above.

A PUCCH allocation may be provided by the serving node. According to some embodiments, a set of PUCCH resources may be provided by the serving node. The PUCCH allocation, including a PUCCH resource or a set of PUCCH resources, may be configured via a system information block and/or indicated in the control information transmitted over the physical downlink control channel (PDCCH). According to some embodiments, upon receiving the HARQ information report with respect to the erroneous decoding of the at least one PDSCH TB, the serving node may re-transmit the at least one PDSCH TB to the UE.

Figure 3A:
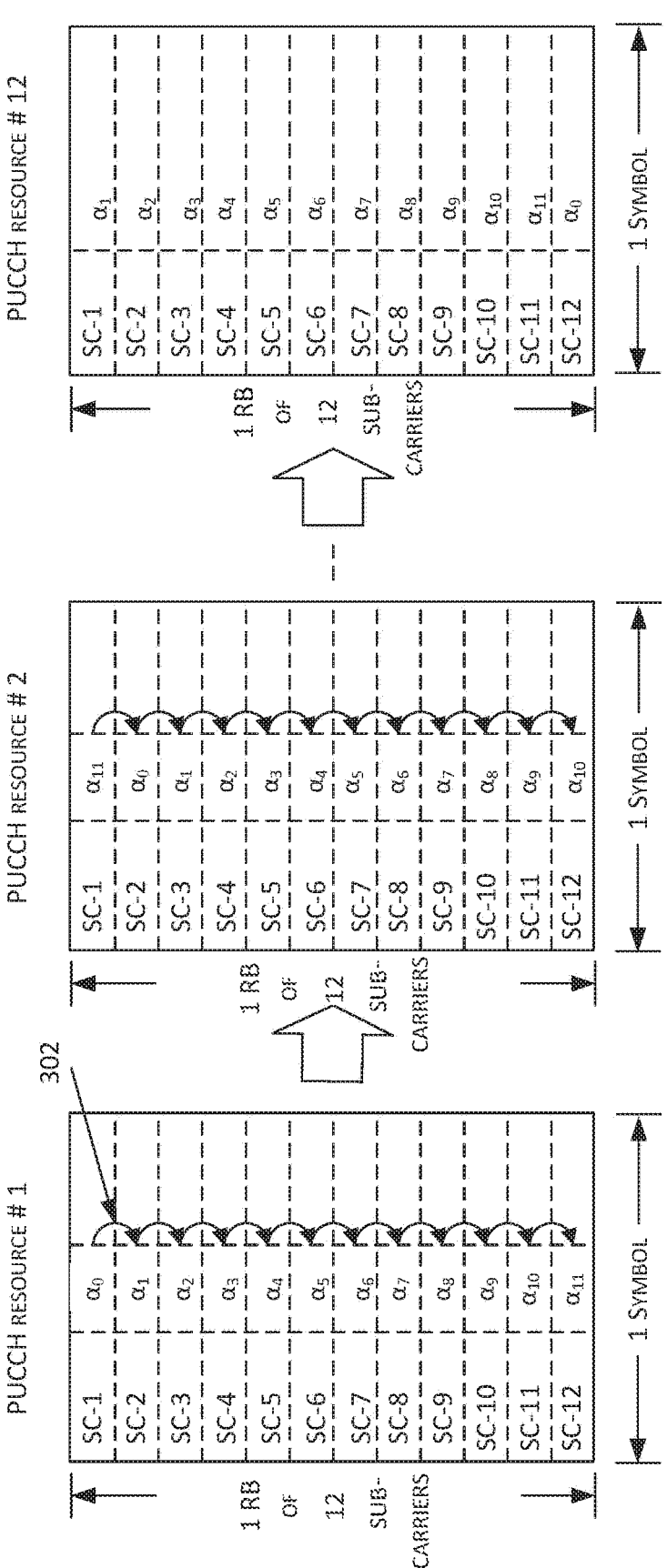
FIG. 3A illustrates an example mapping of a pseudo-random sequence to the sub-carriers of a resource block (RB) according to some embodiments of the present disclosure.

FIG. 3A illustrates an example 300A of mapping a pseudo-random sequence to the sub-carriers of a resource block (RB) according to some embodiments of the present disclosure.

A PUCCH resource may span, in size, over one or two resource blocks (RBs) in a frequency domain, and at least one orthogonal frequency-division multiplexing (OFDM) symbol in a time domain. An RB in the frequency domain in the 5G-NR cellular communication network may be configured according to OFDM to establish up to 12 sub-carriers (SCs) regardless of its sub-carriers spacing configured for a network cell. According to some embodiments, the HARQ information representation format may be based on a pseudo-random sequence of a length of at least the same size as count of SCs in one RB or an integer multiple of the number of SCs in one RB (i.e., when more than one RB is needed). When the PUCCH resource is configured with only one RB, a particular SC count-length pseudo-random sequence among a set of possible cyclic shift hopping pseudo-random sequences may be generated or derived, and mapped sequentially onto the PUCCH resource RB.

As illustrated in FIG. 3A, a pseudo-random sequence of SC count-length may be denoted as $\{\alpha_0, \alpha_1, \alpha_2, \ldots, \alpha_{11}\}$. For example, in the case that the SC count is 12, the sequence $\{\alpha_0, \alpha_1, \alpha_2, \ldots, \alpha_{11}\}$ may be mapped sequentially onto the PUCCH resource RB, where $\alpha_0$ is mapped onto sub-carrier 1 (SC-1), $\alpha_1$ is mapped onto SC-2, and so on until $\alpha_{11}$ is mapped onto SC-12.

Due to the orthogonal property of the pseudo-random sequence, cyclic shift hoppings of the same sequence may be code-division multiplexed (CDM'ed) on the same PUCCH resource RB, and therefore, may be grouped into a set to carry more HARQ information reports collectively. For example, a sequence $\{\alpha_0, \alpha_1, \alpha_2, \ldots, \alpha_{11}\}$ (i.e., an initial SC count-length pseudo-random sequence with cyclic shift hopping of zero) may be mapped onto a PUCCH resource RB as PUCCH resource #1 as illustrated in FIG. 3A. Due to the length of the sequence $\{\alpha_0, \alpha_1, \alpha_2, \ldots, \alpha_{11}\}$, there can be up to a SC count of different cyclic shift hopping patterns, each having a differently-offset or differently-position cyclic shift. Accordingly, one RB in the frequency domain may be effectively regarded as up to a SC count of different PUCCH resources, and may carry up to a SC count of individual HARQ information reports. As illustrated in FIG. 3A, by performing eleven cyclic shift hoppings 302 of the initially generated SC count-length pseudo-random sequence (i.e., sequence $\{\alpha_0, \alpha_1, \alpha_2, \ldots, \alpha_{11}\}$ or PUCCH resource #1), eleven additional sequences may be derived, ranging from a second sequence in an order of $\{\alpha_{11}, \alpha_0, \alpha_1, \alpha_2, \ldots, \alpha_{10}\}$ being derived as PUCCH resource #2, through nine additional sequences in the same vein (which, for brevity, shall not be enumerated individually herein), to a twelfth sequence in an order of $\{\alpha_1, \alpha_2, \alpha_3, \beta_4, \ldots, \alpha_0\}$ being be derived as PUCCH resource #12. The up to a SC count of sequences together make up a set of possible cyclic shift hopping pseudo-random sequences. In accordance, the up to twelve PUCCH resources may be code-division multiplexed (CDM'ed) on the same RB in the frequency domain. It should be appreciated that although the UE may generate or derive one of up to a SC count of different possible shifted cyclic shift hopping patterns as described above in the event that the serving node configures as many PUCCH resources as the SC count, the serving node may configure a smaller number of PUCCH resources as selectable to the UE for NACK-only reporting (the configured number subsequently referred to as a "configured PUCCH count"). The present disclosure is not intended to be limiting. For example, the serving node may configure only 2, 4, 6 or 11 of the generated and derived cyclic shift hopped sequences as PUCCH resources as selectable to the UE for NACK-only reporting. PUCCH resources remaining un-configured as selectable to the UE may be reserved as a reference resource, as described below.

Figure 3B:
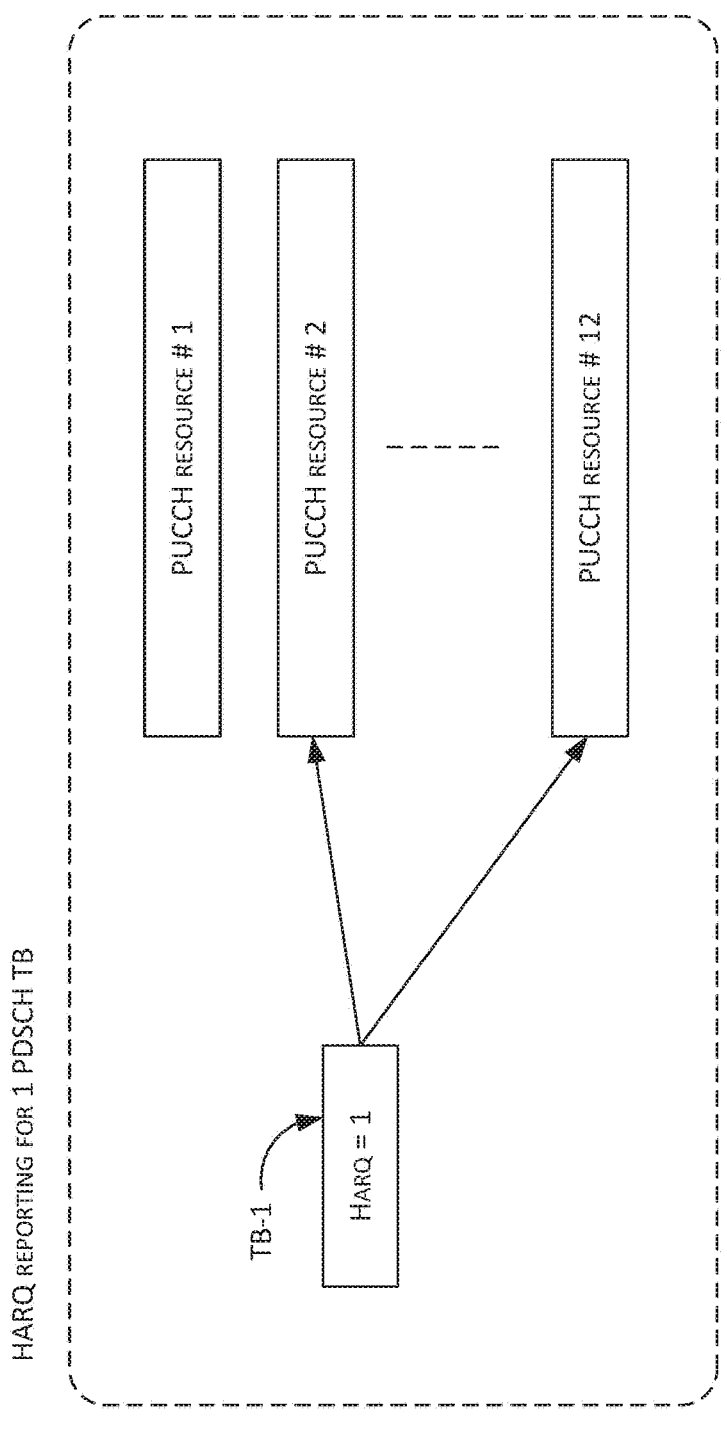
FIG. 3B illustrates an example of selecting a PUCCH resource for transmitting the HARQ feedback for NACK-only reporting according to some embodiments of the present disclosure.

FIG. 3B illustrates an example 300B of selecting a PUCCH resource for transmitting the HARQ feedback for NACK-only reporting according to some embodiments of the present disclosure. When the PUCCH is configured with one or two resource blocks in a frequency domain and only one PDSCH TB is transmitted and decoded erroneously, the HARQ information report may be transmitted via one of the configured PUCCH count of configured PUCCH resources. As illustrated in FIG. 3B, the HARQ information report may include one bit indicating the NACK decoding result of the received PDSCH TB. The UE may select one of the configured PUCCH count of PUCCH resources based on a random selection, based on the UE's identifier (UE-ID) by performing a modulo operation or based on an indication in downlink control information (DCI) scheduling the received PDSCH TB.

This randomization of PUCCH resource selection among different HARQ feedback UEs may accomplish substantially even distribution of the feedback transmission power from all UEs across the configured PUCCH resources. Such substantially even distribution may minimize in-band emission interference from the PUCCH resource RBs to other adjacent RBs in the frequency domain. For example, when a total of X number PUCCH resources are configured, all of which are available for selection, the PUCCH resource that should be selected for NACK-only reporting is determined by finding the remainder of the following modulo operation: "UE-ID mod X," also commonly written as "UE-ID % X" or "mod(UE-ID, X)." According to some embodiments, the selected PUCCH resource may also correspond to a particular cyclic shift hopping of a pseudo-random sequence among a set of possible cyclic shift hopping pseudo-random sequences.

According to some embodiments, one of the configured PUCCH resources may be reserved as a reference resource. The reference resource may not be configured to be selectable by any UE to transmit the HARQ information report in the network cell. The purpose of the reserved PUCCH resource is to provide a reference energy level for comparison during sequence detection process in other PUCCH resource(s) that can be selected by UEs for transmitting HARQ information report. For example, PUCCH resource #1 in FIG. 3B may be reserved as the reference resource, while all other PUCCH resources are configured as selectable by a UE, resulting in a configured PUCCH count of 11. Therefore, the UE may select one of the eleven PUCCH resources numbered 2 to 12 as illustrated in FIG. 3B, to transmit the HARQ information report. Such reservation of a reference resource may improve energy detection accuracy and reliability at the serving node.

FIG. 3C illustrates an example flowchart of a method 300C of transmitting the HARQ feedback for NACK-only reporting according to some embodiments of the present disclosure.

At step 302, a serving node configures a PUCCH allocation to a UE for transmitting the HARQ information report, a PUCCH resource of the PUCCH allocation being configured with one RB in a frequency domain and at least one orthogonal frequency division multiplexing (OFDM) symbol in a time domain. The PUCCH allocation may be allocated by the serving node in the system information block and/or the control information carried in the PDCCH.

At step 304, the UE may receive a physical downlink shared channel (PDSCH) transport block (TB) in the downlink.

At step 306, the UE may generate a HARQ information report including one bit indicating a negative acknowledgement (NACK) of the PDSCH TB. In implementations, when the PDSCH TB is decoded erroneously, the HARQ information report may include a bit "1" to indicate a NACK of the PDSCH TB.

At step 308, the UE may select a PUCCH resource from the PUCCH allocation to transmit the HARQ information report. In implementations, the selection of the PUCCH resource may be random, may be based on the UE identifier, or may be based on an indication in downlink control information (DCI).

At step 310, the UE may determine a timing value corresponding to the selected PUCCH resource. The timing value may set a transmission (Tx) timing of the HARQ information report through the selected PUCCH resource. The timing value may be also referred to as a timing offset/advanced (TA) value.

The TA value is normally assigned by the serving node individually to every RRC connected UE in a network cell for almost all uplink signal and channel transmissions (except for the physical random access channel), such that timing of the downlink and uplink frame/slot/symbol boundaries are always aligned at the serving node within a certain tolerance range (i.e. a cyclic prefix length).

In particular, uplink transmissions with TA may avoid inter-symbol interference between UES of a cell by aligning symbol and slot boundaries from all UEs within a network cell when their signals and channels arrive at the serving node, thereby improving uplink reception reliability for the serving node. For network cells with large coverage areas where propagation delay difference between UEs close to the serving node and UEs at the edge of the network cell, the TA value may be larger than the configured cyclic prefix (CP) length.

According to some embodiments, the serving node may assign a TA value during a random access (RA) procedure when a UE attempts to connect to the serving node in the network cell, or when the UE has lost uplink synchronization with its serving node. It is known that according to current specifications, UEs in RRC idle and inactive states in a 5G-NR network cell are not assigned with TA values, because these UEs are not actively connected to the serving node for uplink transmissions. To mitigate non-assignment of TA values for RRC idle and inactive UEs for NACK-only reporting according to example embodiments of the present disclosure, the present disclosure provides one or more methods corresponding to different operating scenarios.

In one embodiment, the UE may determine the TA value based on a downlink reception timing. When the configuration of the PUCCH resource is allocated for an RRC idle and/or inactive UE to transmit its HARQ information report and the UE does not receive a specified uplink timing advance, the UE may assume TA=0 and use downlink reception timing to transmit its HARQ information report over the PUCCH resource.

In a 5G-NR time-domain duplexing (TDD) system, downlink and uplink symbols and slots are separated and time multiplexed in a same frequency carrier. According to a 5G-NR frequency-domain duplexing (FDD) system, downlink and uplink symbols and slots are operated in different frequency carriers but are synchronized in all levels (i.e., system frame number, slot and symbol boundaries).

By following the downlink reception timing, the UE may derive the symbol and slot timing corresponding to the PUCCH resource for transmitting HARQ information reports according to the synchronization signal block (SSB), PDSCH and/or reference signals received in the downlink. The present example embodiment may be implemented with respect to a 5G-NR network cell with a small coverage area, where round-trip time (RTT) delay (a sum of signal propagation delays in both downlink and uplink) anywhere within the cell is less than the cell CP length; substitution of TA=0 in the case of non-specification of uplink TA for the uplink PUCCH transmission from RRC idle and/or inactive UEs may be performed in such cases, but not in larger cells where RTT is non-negligible.

According to another embodiment, the UE may determine the TA value based on a reference signal received power (RSRP) measurement for the downlink and according to a set of TA values or thresholds. The serving node may specify to UEs, via RRC signalling or indicate using downlink control information (DCI) carried in PDCCH, a set of TA values or thresholds that correspond to different RSRP range or thresholds. When an RRC idle or inactive UE needs to transmit a HARQ information report using a selected PUCCH resource, the UE may select a TA value specified in the set of TA values or thresholds according to a most recent RSRP measurement.

Table 1 below illustrates a mapping of TA values to different DL-RSRP ranges according to example embodiments of the present disclosure. As illustrated, if a most recent measured RSRP value from a NACK-only reporting UE falls in between the RSRP range of a and b, the UE uses Y as the TA value to transmit the HARQ information report in the PUCCH resource. As also illustrated in Table 1, one of these configured values can be zero (TA=0) signifying a large RSRP value that corresponds to a small pathloss between the serving node and the UE; a timing advance in the uplink transmissions is thus not required.

| Timing Advance (TA) | RSRP range |
|---|---|
| X | measured_RSRP ≤ a |
| Y | a < measured_RSRP ≤ b |
| Z | b < measured_RSRP ≤ c |
| 0 | c < measured_RSRP |

According to some embodiments, the illustrated Table 1 may be also implemented in a UE as a set of RSRP threshold values according to an exemplary set of pseudo computing code shown below, where the value {a, b, c} indicates a set of RSRP thresholds.

```
If (measured_RSRP ≤ a), then: Timing advance = X;
elseif (measured_RSRP ≤ b), then: Timing advance = Y;
elseif (measured_RSRP ≤ c), then: Timing advance = Z;
else: Timing advance = 0.
```

According to yet another embodiment, the UE may determine the TA value based on a latest TA value provided by the serving node during an RRC connected state of the UE. For an RRC inactive UE, it was once in an RRC connected state with its serving node before entering the inactive state. That is, the serving node would have specified a TA value to the UE prior to the UE entering the inactive state. Therefore, the UE may apply, for uplink HARQ information report transmission in the PUCCH resource, the latest TA value provided by the serving node during the RRC connected state prior to entering the RRC inactive state. According to this embodiment, the latest TA value provided by the serving node during the RRC connected state may be applicable for a limited duration of time.

According to yet another embodiment, the UE may determine the TA value based on a timing offset between a global navigation satellite system (GNSS) timing and a system frame or slot number or boundary. The camping or serving node may provide a GNSS timing offset via RRC configuration or downlink DCI to RRC idle or inactive UEs in a network cell. The GNSS timing offset provides an absolute offset value in time relative to the system frame or slot number or boundary. Based at least on the provided GNSS timing offset value and the actual reception timing (time stamp) of the system frame or slot number or boundary, an RRC idle or inactive UE may calculate the signal propagation delay between the camping or serving node and the UE. Base on the signal propagation delay, the RRC idle or inactive UE may determine the TA value (e.g. TA=2× calculated propagation delay) for transmitting the HARQ feedback report through the PUCCH.

It should be appreciated that each method of determining the TA values as described above may be implemented individually or may be implemented in any combination of one or more methods, in any logical ordering thereof. For example, the method wherein the UE may determine the TA value based on a latest TA value may be implemented as a default, which may switch to any of the other methods after a switching condition, such as a time limit elapsing, is satisfied.

At step 312, the UE may determine a power level corresponding to the selected PUCCH resource.

According to current specifications of 5G-NR cellular communication networks, a power control command (PCC) is provided individually to RRC connected UEs in a network cell for almost all uplink signal and channel transmissions (except for physical random access channel) so that the received power at the serving node among the different transmitting UEs is at a similar level to avoid in-band emission (IBE) interference between adjacent frequency RBs and inter-UE interference when they are CDM'ed. Such a technique enables serving nodes to count a number of NACK-only reports based on the total received power per PUCCH resource. According to example embodiments of the present disclosure, alternative methods of determining a HARQ information report transmission power level for RCC idle or inactive UEs are provided.

In one embodiment, the UE may determine the power level based on an open-loop power control (OLPC) scheme.

Since RRC idle or inactive UEs do not transmit any signal and channel in the uplink, if an idle or inactive state UE does not move out of its current service location area, the UE will not receive any power control command (PCC) directly from the camping or serving node while in RRC idle and inactive states. Without an explicit indication of power level from the serving node for uplink transmissions, an RRC idle or inactive UE may derive the transmit power level for the HARQ information reports based on an open-loop power control (OLPC) scheme.

In the OLPC scheme for HARQ information report transmission for an RRC idle or inactive UE, the serving node may indicate its transmission power level for the downlink synchronization signal block (SSB) or reference signal (RS) via RRC configuration or DCI signaling in the PDCCH. Based on the reception of downlink SSB/RS and the indication of one of their power levels from the serving node, an RRC idle or inactive UE may measure the RSRP and calculate the pathloss for the downlink.

For example, given X dBm as transmit power of SSB or RS indicated by the serving node, and given Y dBm as receiving power of the SSB/RS (i.e., RSRP) measured by the UE, downlink pathloss can be calculated as (X−Y) dB. By estimating the downlink pathloss, the UE may derive a HARQ information report transmission power by assuming a target received power that should be received by the serving node. The serving node may further provide the target received power via RRC configuration or DCI signaling when scheduling the downlink PDSCH, to improve or maintain a certain reception reliability of the HARQ information report transmission at the serving node. If the target received power for the HARQ information report transmission is set to Z dBm, the UE should allocate a power level of Z+(X−Y) dBm to transmit the HARQ information report through the PUCCH resource.

According to another embodiment, the UE may determine the power level based on a reference signal received power (RSRP) measurement for the downlink and according to a set of RSRP values or thresholds. According to the RSRP-threshold based scheme, a range of the transmission power levels that correspond to different RSRP-thresholds may be configured to the UEs via a cell-common RRC configuration (e.g. SIB) or downlink DCI signalling. The RRC idle or inactive UE may select a suitable power level from the configured transmission power levels for transmitting the HARQ information report according to its measured downlink RSRP level.

Table 2 below illustrates a mapping of Tx power levels to different DL-RSRP ranges according to example embodiments of the present disclosure. As illustrated, if the most recent measured RSRP value from a NACK-only reporting UE falls in between the RSRP range of a and b, the UE uses Y as the transmission power level to transmit the HARQ information report in the PUCCH resource.

| Transmitting (Tx) Power | RSRP range |
| --- | --- |
| X | measured_RSRP ≤ a |
| Y | a < measured_RSRP ≤ b |
| Z | b < measured_RSRP ≤ c |
| W | c < measured_RSRP |

Similar to the TA value determination, the illustrated Table 2 may be also implemented in a UE as a set of RSRP threshold values according to an exemplary set of pseudo computing code shown below, where the value {a, b, c} indicates a set of RSRP thresholds.

```
If (measured_RSRP ≤ a), then: Tx Power level = X;
elseif (measured_RSRP ≤ b), then: Tx Power level = Y;
elseif (measured_RSRP ≤ c), then: Tx Power level = Z;
else: Tx Power level = W.
```

According to yet another embodiment, the UE may determine the power level based on a latest power level provided by the serving node during an RRC connected state of the UE. For an RRC inactive UE, the most recent PCC received while in the RRC connected state may be used to set its power level to transmit HARQ information reports after entering into the RRC inactive state. The use of this embodiment may be restricted for a limited duration of time, after which, the UE may adopt one or more of the above embodiments for setting its power level for transmitting the HARQ information report.

At step 314, the UE may transmit the HARQ information report through the selected PUCCH resource according to the timing value and the power level.

Figure 4A:
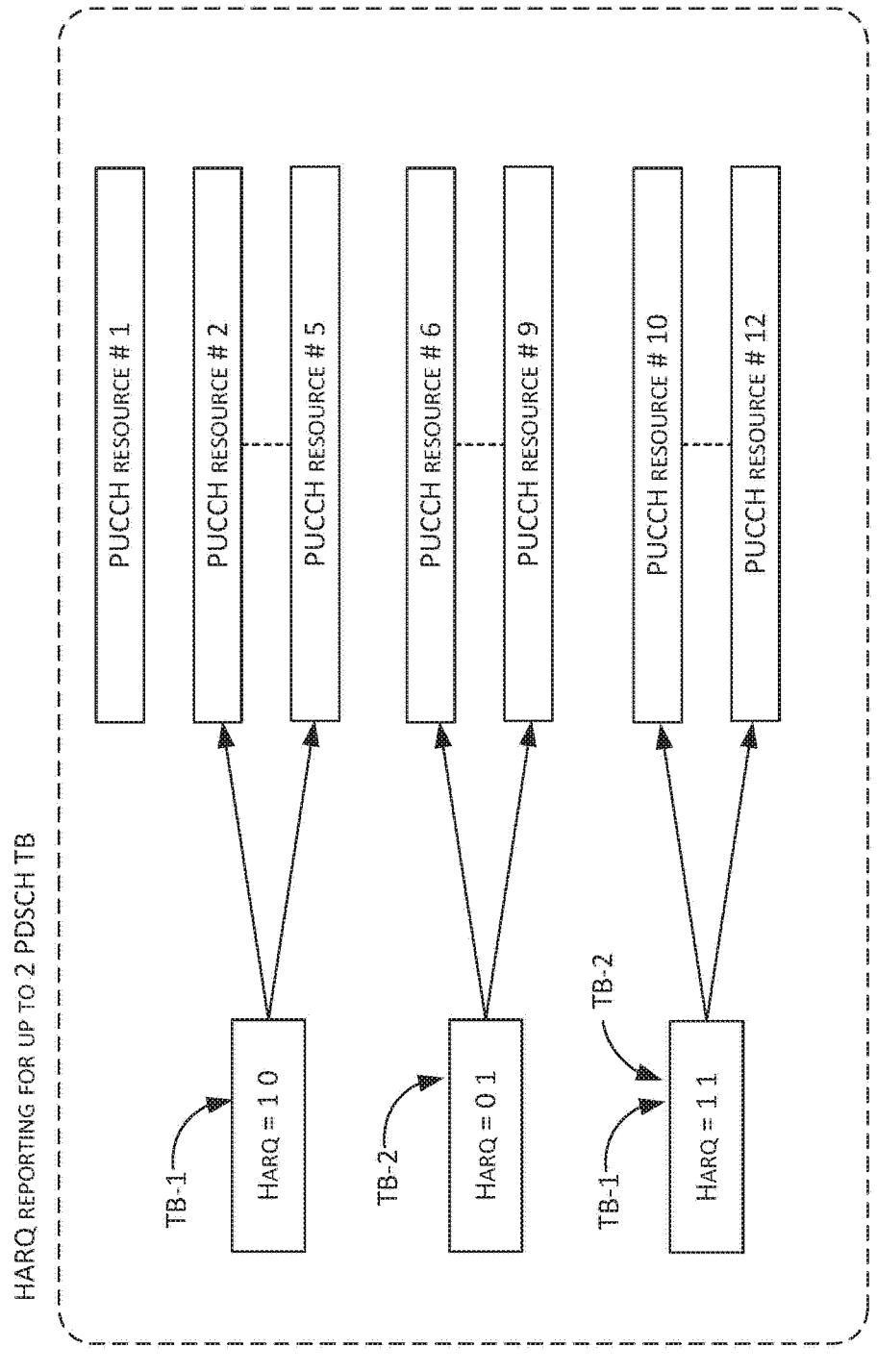
FIG. 4A illustrates another example flowchart of a method of selecting a PUCCH resource for transmitting the HARQ feedback for NACK-only reporting according to some embodiments of the present disclosure.

FIG. 4A illustrates another example 400A of selecting a PUCCH resource for transmitting the HARQ feedback for NACK-only reporting according to some embodiments of the present disclosure.

According to some embodiments, an RRC idle or inactive UE may receive two PDSCH TBs in the downlink and need to perform NACK-only reporting to the serving node. The UE may transmit the HARQ information report for one of the two PDSCH TBs or both PDSCH TBs using one of the configured PUCCH resources that are allocated for feedback. The UE cannot transmit and multiplex two PUCCH resources simultaneously in the same frequency RB as two orthogonal codes cannot be encoded; the UE cannot transmit and multiplex two separate RBs in the same symbol due to high PAPR/cubic metrics.

Thus, the ULE may select only a single PUCCH resource to represent the NACK report for just one PDSCH TB or both PDSCH TBs. A set of PUCCH resources of a PUCCH allocation for NACK-only reporting may be divided into 3 different subsets, with each subset of at least 1 PUCCH resource is assigned and to be selected for NACK-only reporting of one of two PDSCH TBs or both PDSCH TBs. Alternatively, the serving node may configure 3 different sets of PUCCH resources for the same purpose and usage.

As illustrated in the example 400A of FIG. 4A, a PUCCH allocation includes a set of 12 PUCCH resources for the proposed NACK-only reporting from RRC idle or inactive UEs. PUCCH resource #1 is reserved for energy detection reference level. The remaining configured PUCCH resources (where configured PUCCH count is 11) may be further divided into 3 subsets of non-overlapping PUCCH resources, where the first subset includes PUCCH resource #2 to PUCCH resource #5, the second subset includes PUCCH resource #6 to PUCCH resource #9, and the third subset includes PUCCH resource #10 to PUCCH resource #12.

The HARQ information may be represented by two bits, where HARQ bits {1 0} denotes NACK decoding result for the received PDSCH TB-1 only, HARQ bits {0 1} denotes NACK report for PDSCH TB-2 only, and HARQ bits {1 1} denotes NACK report for both PDSCH TB-1 and PDSCH TB-2. The serving node may further assign the first subset of PUCCH resources to be selected by an idle or inactive UE to represent NACK decoding result for PDSCH TB-1 only, the second subset to represent NACK report for PDSCH TB-2 only, and third subset to represent NACK report for both PDSCH TB-1 and PDSCH TB-2.

According to the present embodiment, the ULE may transmit its NACK-only report for up to two PDSCH TBs using just one PUCCH resource from one of the three subsets. The determination of an exact PUCCH resource to be selected for the HARQ information report transmission from one of the three subsets may be based on a random selection, a UE-ID or an indication in downlink control information scheduling the PDSCH TBs, as described above.

FIG. 4B illustrates an example flowchart of a method 400B of providing the NACK-only feedback according to some embodiments of the present disclosure.

At step 402, a serving node may configure a PUCCH allocation to a UE including a set of PUCCH resources for transmitting the HARQ information report by the UE, a PUCCH resource of the PUCCH allocation being configured with one RB in a frequency domain and at least one orthogonal frequency division multiplexing (OFDM) symbol in a time domain. The set of PUCCH resources of the PUCCH allocation may be provided by the serving node through the system information block and/or the control information carried in the PDCCH.

At step 404, the UE may receive two physical downlink shared channel (PDSCH) transport blocks (TBs) in the downlink.

At step 406, the UE may determine that one or two of the PDSCH TBs is decoded erroneously.

At step 408, the UE may generate a HARQ information report including two bits indicating a negative acknowledgement (NACK) of at least one of the two PDSCH TBs. When one PDSCH TB is decoded erroneously, the HARQ information report may include "1" to indicate the NACK report of the PDSCH TB. For the two PDSCH TBs scenario, HARQ information report may include three representations of two bits corresponding to the decoding status of the two PDSCH TBs. For example, {1 0} may represent an erroneous decoding of only a first TB, {0 1} may represent an erroneous decoding of only a second TB, and {1 1} may represent an erroneous decoding of both the first TB and the second TB.

At step 410, the UE may select one PUCCH resource from a PUCCH allocation according to the NACK report to transmit the HARQ information report. The selection of the PUCCH resource may be random based, based on the UE identifier, or based on an indication in downlink control information. For the two PDSCH TBs scenario, the set of PUCCH resources of the PUCCH allocation may be divided into three subsets corresponding to three representations of the decoding status, respectively. According to some embodiments, individual subset of the PUCCH resources is configured for certain representation of decoding status. Alternatively, all three subsets are configured for the same use. The UE may determine one of the subsets of PUCCH resources and select one PUCCH resource to transmit the HARQ information report.

At step 412, the UE may determine a timing value corresponding to the selected PUCCH resource as described above with respect to FIG. 3C.

At step 414, the UE may determine a power level corresponding to the selected PUCCH resource as described above with respect to FIG. 3C.

At step 416, the UE may transmit the HARQ information report through the selected PUCCH resource according to the timing value and the power level as described above with respect to FIG. 3C.

Figure 5A:
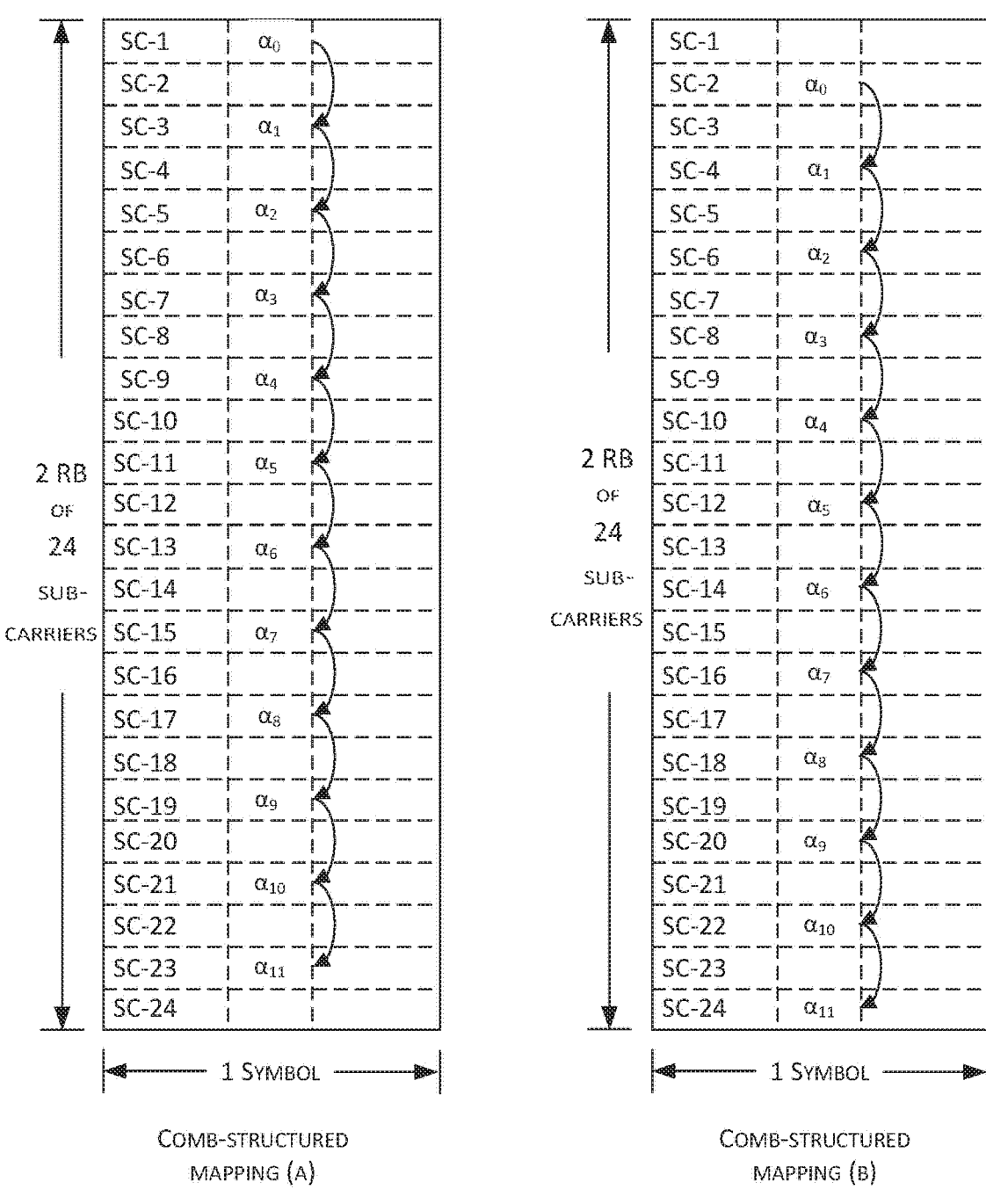
FIG. 5A illustrates an example mapping of a pseudo-random sequence to the sub-carriers of two resource blocks (RBs) according to some embodiments of the present disclosure.

FIG. 5A illustrates an example 500A of mapping a pseudo-random sequence to the sub-carriers of two resource blocks (RBs) according to some embodiments of the present disclosure.

According to some embodiments, when the PUCCH resource allocated for the NACK-only report is configured with two consecutive/adjacent frequency RBs of a total of 24 SCs, the length-12 pseudo-random sequence (where a SC count is 12, counting only SCs of one RB) may be mapped to a comb-structure, wherein only every second SC within the allocated two RBs is mapped with an element from the SC count-length pseudo-random sequence. By such a mapping, the time domain signal energy of the transmitted sequence will be concentrated only in one half of the OFDM symbol, depending on the odd-numbered or even-numbered SCs within the two RBs that the sequence is mapped to.

Example comb-structured mappings of a SC count-length pseudo-random sequence over two consecutive/adjacent frequency RBs are illustrated FIG. 5A. In comb-structured mapping (a), the elements from the sequence $\{\alpha_0, \alpha_1, \alpha_2, \ldots, \alpha_{11}n\}$ are mapped to the odd-numbered SCs within the allocated two RBs. In comb-structured mapping (b), the elements from the sequence $\{\alpha_0, \alpha_1, \alpha_2, \ldots, \alpha_{11}\}$ are mapped to the even-numbered SCs within the allocated two RBs.

To mitigate frequency of low received signal strength from cell edge UEs in network cells with a large coverage area, multiple consecutive OFDM symbols in a slot may be configured for the PUCCH resources. When more than one OFDM symbol is configured for the NACK-only reporting, the SC count-length pseudo-random sequence may be first generated for one symbol only (i.e., first symbol of the configured PUCCH resource). The SC count-length pseudo-random sequence may be further repeated and transmitted over the multiple OFDM symbols, thus boosting combined gain at the serving node to boost reception performance/reliability.

FIG. 5B illustrates another example flowchart of a method 500B of providing the HARQ feedback for NACK-only reporting according to some embodiments of the present disclosure.

At step 502, a serving node may configure a PUCCH allocation to a ULE including a PUCCH resource or a set of PUCCH resources for transmitting the HARQ information report, the PUCCH resource being configured with two RBs in a frequency domain and at least one orthogonal frequency division multiplexing (OFDM) symbol in a time domain. The PUCCH allocation may be configured with a PUCCH resource or a set of PUCCH resources provided by the serving node through the system information block and/or the control information carried in the PDCCH.

At step 504, the UE may receive one physical downlink shared channel (PDSCH) transport block (TB) in the downlink.

At step 506, the UE may determine that the PDSCH TB is decoded erroneously.

At step 508, the UE may generate a HARQ information report including one bit indicating a NACK report of the PDSCH TB as described above with respect to FIG. 3C.

At step 510, the UE may select one PUCCH resource from a PUCCH allocation to transmit the HARQ information report as described above with respect to FIG. 3C.

At step 512, the UE may determine a timing value corresponding to the selected PUCCH resource as described above with respect to FIG. 3C.

At step 514, the UE may determine a power level corresponding to the selected PUCCH resource as described above with respect to FIG. 3C.

At step 516, the UE may transmit, via odd-numbered or even-numbered sub-carriers of the two RBs, the HARQ information report through the selected PUCCH resource according to the timing value and the power level.

FIG. 6 illustrates another example flowchart of a method 600 of providing the HARQ feedback for NACK-only reporting according to some embodiments of the present disclosure.

At step 602, a serving node may configure a PUCCH allocation to a UE including a set of PUCCH resources for transmitting the HARQ information report, the PUCCH being configured with two RBs in a frequency domain and at least one orthogonal frequency division multiplexing (OFDM) symbol in a time domain. The PUCCH allocation may be configured with a set of PUCCH resources provided by the serving node through the system information block and/or the control information carried in the PDCCH.

At step 604, the UE may receive two physical downlink shared channel (PDSCH) transport blocks (TBs) in the downlink.

At step 606, the UE may determine that one or two of the two PDSCH TBs is decoded erroneously.

At step 608, the UE may generate a HARQ information report including two bits indicating a NACK report of the one or two PDSCH TBs as described above with respect to FIG. 4B.

At step 610, the UE may select one PUCCH resource from a PUCCH allocation according to the NACK report to transmit the HARQ information report as described above with respect to FIG. 4B.

At step 612, the UE may determine a timing value corresponding to the selected PUCCH resource as described above with respect to FIG. 3C.

At step 614, the UE may determine a power level corresponding to the selected PUCCH resource as described above with respect to FIG. 3C.

At step 616, the UE may transmit, via odd-numbered or even-numbered sub-carriers of the two RBs, the HARQ information report through the selected PUCCH resource according to the timing value and the power level as described above with respect to step 516 in FIG. 5B.

Figure 7:
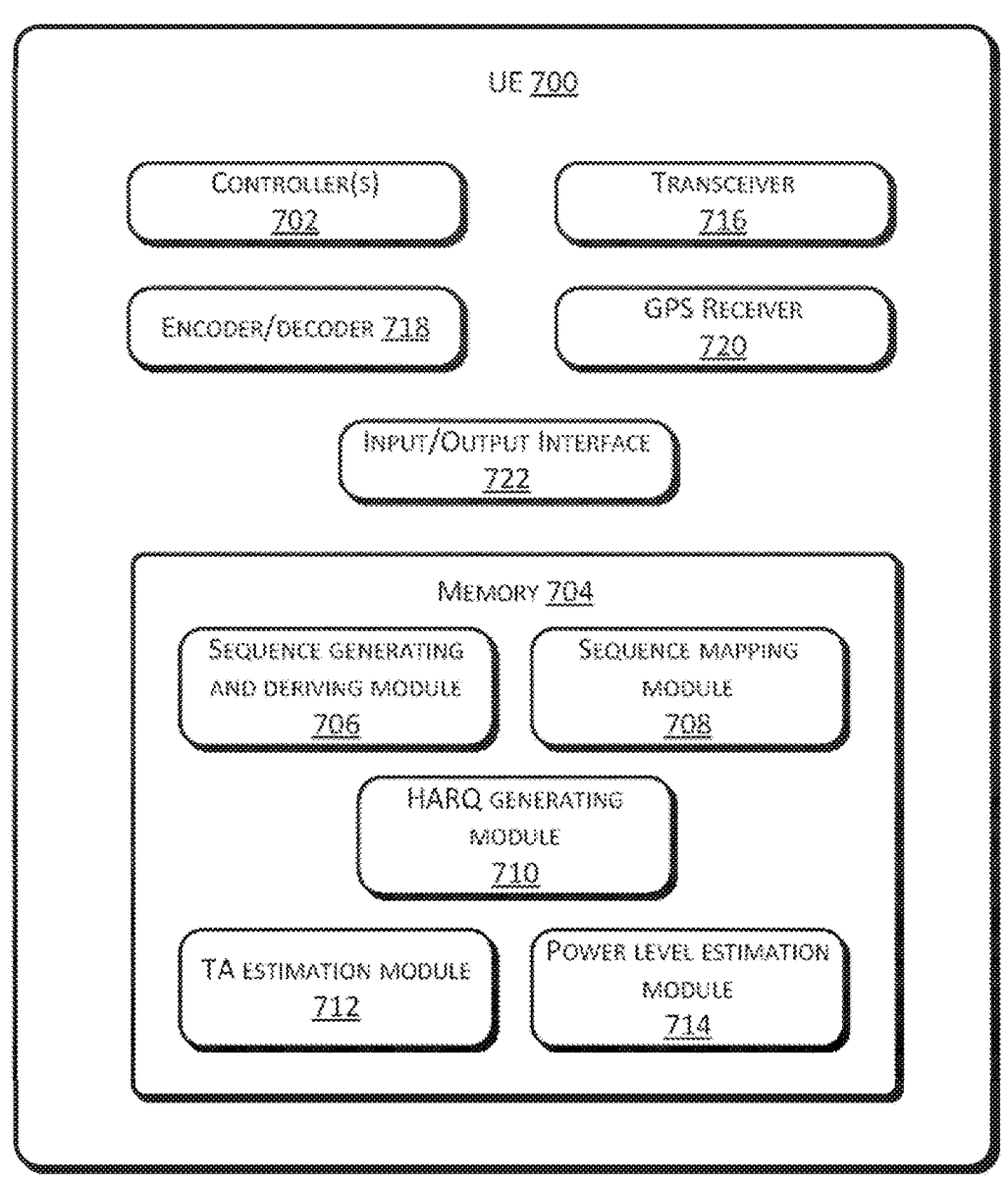
FIG. 7 illustrates an example UE for implementing the processes and methods described above for implementing NACK-only reporting.

FIG. 7 illustrates an example UE 700 for implementing the processes and methods described above for implementing NACK-only reporting.

The UE 700 shown in FIG. 7 is only one example of a system and is not intended to suggest any limitation as to the scope of use or functionality of any computing device or mobile devices utilized to perform the processes and/or procedures described above.

The UE 700 may include one or more controller(s) 702 and memory 704 communicatively coupled to the controller(s) 702. The controller(s) 702 may execute one or more modules and/or processes to cause the controller(s) 702 to perform a variety of functions. Additionally, each of the controller(s) 702 may possess its own local memory, which also may store program modules, program data, and/or one or more operating systems.

Depending on the exact configuration and type of the UE 700, the memory 704 may be volatile, such as RAM, non-volatile, such as ROM, flash memory, miniature hard drive, memory card, and the like, or some combination thereof. The UE 700 may include one or more computer-executable modules that are executable by the controller(s) 702. The one or more computer-executable modules may be hosted on a network as services for a data processing platform, which may be implemented on a separate system from the UE 700.

The one or more computer-executable modules may include, but are not limited to, a sequence generating and deriving module 706, a sequence mapping module 708, a HARQ generating module 710, a TA estimation module 712, and a power level estimation module 714.

The sequence generating and deriving module 706 may be configured to generate a pseudo-random sequence to represent the HARQ information report. The length of the pseudo-random sequence may correspond to the number of sub-carriers in a resource block configured in the PUCCH resource. The sequence generating and deriving module 706 may further perform cyclic shift hopping operations based on an initial pseudo-random sequence to derive a cyclic shift hopped pseudo-random sequence, among up to as many cyclic shift hopped pseudo-random sequences as the configured PUCCH count less one. By utilizing the orthogonal property of the pseudo-random sequence, different cyclic shift hopped versions of the initial pseudo-random sequence can be code-division multiplexed (CDM'ed) on the same PUCCH resource such that the PUCCH resource can be selected by multiple UEs, to carry more HARQ information reports. When the PUCCH resource is configured with multiple consecutive OFDM symbols in a slot, the sequence generating and deriving module 706 may generate the pseudo-random sequence for the first symbol. The pseudo-random sequence is further repeated and transmitted over the rest of OFDM symbols, thus, increasing combining gain at the serving node to boost reception performance and reliability in network cells with a large coverage area.

The sequence mapping module 708 may be configured to map up to the configured PUCCH count of pseudo-random sequences generated and derived by cyclic shift hopping operations to the resource block. When the PUCCH resource is configured with one RB consisting of 12 sub-carriers, individual elements of the pseudo-random sequence may be sequentially mapped to the 12 sub-carriers of the RB. When the PUCCH resource is configured with two RBs, each consisting of 12 sub-carriers, individual elements of the pseudo-random sequence may be sequentially mapped to odd-numbered or even-numbered sub-carriers of the two RBs. According to example embodiments of the present disclosure, any SC count may be substituted for the number 12 as described above. By doing so, the time domain signal energy of the transmitted sequence is concentrated only in one half of the OFDM symbol, depending on the odd-numbered or even-numbered sub-carriers within the two RBs that the pseudo-random sequence is mapped to.

The HARQ generating module 710 may be configured to generate HARQ information report to feedback a negative acknowledge of the received TB(s) in the downlink as described above with reference to FIGS. 2, 3C, 4B, 5B, and 6.

The TA estimation module 712 may be configured to estimate a transmission (Tx) timing for the NACK reporting through the PUCCH resource as described above with reference to FIGS. 3C, 4B, 5B, and 6.

The power level estimation module 714 may be configured to estimate a transmission (Tx) power for the NACK reporting through the PUCCH resource as described above with reference to FIGS. 3C, 5B, 4B, and 6.

The UE 700 may additionally include a transceiver 716, an encoder/decoder 718, a global position system (GPS) receiver 720, and an input/output (I/O) interface 722. It should be appreciated that the elements of UE 700 described above are for the illustration purpose. A user equipment may include more or fewer elements depending on the configurations. The present disclosure is not intended to be limiting.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory ("RAM")) and/or non-volatile memory (such as read-only memory ("ROM"), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more controllers, may perform operations described above with reference to FIGS. 1-6. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

EXAMPLE CLAUSES

A. A method implemented by a user equipment (UE), the method comprising: receiving, from a serving node and via a new radio (NR) radio access network (RAN), at least one physical downlink shared channel (PDSCH) transport block; determining that a first PDSCH transport block is decoded erroneously during a UE radio resource control (RRC) idle state or a UE RRC inactive state; generating a hybrid automatic repeat request (HARQ) information report indicating a negative acknowledgement (NACK) of the first PDSCH transport block; and performing NACK-only reporting to the serving node.

B. The method according to paragraph A, further comprising: determining that a second PDSCH transport block is decoded correctly or is not decoded; and determining not generating a HARQ information report indicating an acknowledgement (ACK) of the second PDSCH transport block.

C. The method according to paragraph A, wherein a physical uplink control channel (PUCCH) allocation to the UE configured at the serving node includes a PUCCH resource or a set of PUCCH resources numbered at a configured PUCCH count, a PUCCH resource of the PUCCH allocation comprising one resource block in a frequency domain and comprising at least one orthogonal frequency division multiplexing (OFDM) symbol in a time domain, the resource block comprising a plurality of sub-carriers (SCs) numbered at a SC count.

D. The method according to paragraph C, wherein the at least one PDSCH transport block received by the user equipment comprises one transport block, the PUCCH allocation comprises a set of PUCCH resources, and the generated HARQ information report includes one bit that indicates a decoding status of the transport block; and performing NACK-only reporting comprises: selecting one PUCCH resource from the PUCCH allocation; and transmitting, to the serving node, one among up to a SC count of possible cyclic shift hopping pseudo-random sequences representing the HARQ information report through the selected PUCCH resource.

E. The method according to paragraph D, wherein the configured PUCCH count is less than the SC count, and one PUCCH resource outside of the PUCCH allocation is reserved as a reference resource.

F. The method according to paragraph D, wherein the selecting one PUCCH resource from the PUCCH allocation is based on random selection, based on at least a UE identifier, or based on an indication in downlink control information (DCI).

G. The method according to paragraph D, further comprising: determining a timing value corresponding to the selected PUCCH resource; and transmitting the HARQ information report through the selected PUCCH resource according to the timing value.

H. The method according to paragraph G, wherein determining a timing value corresponding to the selected PUCCH resource further comprises: receiving, from the serving node, a synchronization signal block (SSB) and/or a physical downlink shared channel; and determining the timing value corresponding to the selected PUCCH resource according to a receive timing of the SSB and/or physical downlink shared channel.

I. The method according to paragraph G, wherein determining a timing value corresponding to the selected PUCCH resource further comprises: receiving, from the serving node, a set of at least one timing value corresponding to a set of at least one range of reference signal received power (RSRP) values or thresholds; measuring a reference signal received power level; and determining the timing value corresponding to the selected PUCCH resource according to the measured reference signal received power level and the provided set of at least one range of reference signal received power values or thresholds; wherein the provided set of at least one timing value corresponding to the set of at least one range of RSRP values or thresholds are RRC configured and/or indicated in downlink control information (DCI).

J. The method according to paragraph G, wherein determining a timing value corresponding to the selected PUCCH resource further comprises: determining the timing value corresponding to a latest timing value provided by the serving node during a RRC connected state.

K. The method according to paragraph G, wherein determining a timing value corresponding to the selected PUCCH resource further comprises: receiving, from the serving node, a timing offset between a global navigation satellite system (GNSS) timing and system frame or slot number or boundary; deriving a time stamp for a received downlink signal or channel; calculating a propagation delay according to the GNSS timing offset and the time stamp; and determining the timing value according to the propagation delay, wherein the GNSS timing offset is RRC configured or indicated in DCI.

L. The method according to paragraph D, further comprising: determining a power level corresponding to the selected PUCCH resource; and transmitting the HARQ information report through the selected PUCCH resource according to the power level.

M. The method according to paragraph L, wherein determining a power level corresponding to the selected PUCCH resource further comprises: receiving, from the serving node, at least one of a synchronization signal block (SSB) or a channel state information —reference signal (CSI-RS) and a transmitting power thereof; measuring a received power of the at least one of SSB or CSI-RS; calculating a pathloss according to at least the transmitting power and the received power of the at least one of SSB or CSI-RS; and determining the power level corresponding to the selected PUCCH resource according to at least the pathloss and a target received power, wherein the target received power is RRC configured or indicated in DCI by the serving node.

N. The method according to paragraph L, wherein determining a power level corresponding to the selected PUCCH resource further comprises: receiving, from the serving node, a range of transmission power levels and a set of corresponding RSRP threshold values; measuring a reference signal received power level; and determining the power level corresponding to the selected PUCCH resource according to the measured reference signal received power level and the set of RSRP threshold values.

O. The method according to paragraph L, wherein determining a power level corresponding to the selected PUCCH resource further comprises: determining the power level corresponding to a latest power level provided by the serving node during a RRC connected state.

P. The method according to paragraph B or C, wherein the at least one PDSCH transport block received by the user equipment comprises two transport blocks, and the configured PUCCH allocation comprises three subsets of PUCCH resources, each subset of PUCCH resources being designated for transmitting the HARQ information report according to decoding status of the two transport blocks.

Q. The method according to paragraph P, wherein a first subset of PUCCH resources is designated for transmitting the HARQ information report indicating a first transport block being decoded erroneously; a second subset of PUCCH resources is designated for transmitting the HARQ information report indicating a second transport block being decoded erroneously; and a third subset of PUCCH resources is designated for transmitting the HARQ information report indicating the first transport block and the second transport block being decoded erroneously.

R. The method according to paragraph P, further comprising: generating the HARQ information report including two bits that indicate the decoding status of the two transport blocks; determining a subset of PUCCH resources from the three subsets of PUCCH resources according to the decoding status of the two transport blocks; selecting one PUCCH resource from the determined subset of PUCCH resources; and transmitting, to the serving node, one among up to a SC count of possible cyclic shift hopping pseudo-random sequences representing the HARQ information report through the selected PUCCH resource.

S. The method according to paragraph R, further comprising: determining a timing value corresponding to the selected PUCCH resource; and transmitting the HARQ information report through the selected PUCCH resource according to the timing value.

T. The method according to paragraph S, wherein determining a timing value corresponding to the selected PUCCH resource further comprises: receiving, from the serving node, a synchronization signal block (SSB) and/or a physical downlink shared channel; and determining the timing value corresponding to the selected PUCCH resource according to a receive timing of the SSB and/or physical downlink shared channel.

U. The method according to paragraph S, wherein determining a timing value corresponding to the selected PUCCH resource further comprises: receiving, from the serving node, a set of at least one timing value corresponding to a set of at least one range of reference signal received power (RSRP) values or thresholds; measuring a reference signal received power level; and determining the timing value corresponding to the selected PUCCH resource according to the measured reference signal received power level and the provided set of at least one range of reference signal received power values or thresholds.

V. The method according to paragraph S, wherein determining a timing value corresponding to the selected PUCCH resource further comprises: determining the timing value corresponding to a latest timing value provided by the serving node during a RRC connected state.

W. The method according to paragraph S, wherein determining a timing value corresponding to the selected PUCCH resource further comprises: receiving, from the serving node, a timing offset between a global navigation satellite system (GNSS) timing and system frame or slot number or boundary; deriving a time stamp for a received downlink signal or channel; calculating a propagation delay according to the GNSS timing offset and the time stamp; and determining the timing value according to the propagation delay; wherein the GNSS timing offset is RRC configured or indicated in DCI.

X. The method according to paragraph R, further comprising: determining a power level corresponding to the selected PUCCH resource; and transmitting the HARQ information report through the selected PUCCH resource according to the power level.

Y. The method according to paragraph X, wherein determining a power level corresponding to the selected PUCCH resource further comprises: receiving, from the serving node, at least one of a synchronization signal block (SSB) or a channel state information —reference signal (CSI-RS) and a transmitting power thereof; measuring a received power of the at least one of SSB or CSI-RS; calculating a pathloss according to at least the transmitting power and the received power of the at least one of SSB or CSI-RS; and determining the power level corresponding to the selected PUCCH resource according to at least the pathloss and a target received power; wherein the target received power is RRC configured or indicated in DCI by the serving node.

Z. The method according to paragraph X, wherein determining a power level corresponding to the selected PUCCH resource further comprises: receiving, from the serving node, a range of transmission power levels and a set of corresponding RSRP threshold levels; measuring a reference signal received power level; and determining the power level corresponding to the selected PUCCH resource according to the measured reference signal received power level and the set of RSRP threshold levels.

AA. The method according to paragraph X, wherein determining a power level corresponding to the selected PUCCH resource further comprises: determining the power level corresponding to a latest power level provided by the serving node during an RRC connected state.

AB. The method according to paragraph A or B, wherein a PUCCH allocation to the UE configured at the serving node includes a set of PUCCH resources, a PUCCH resource of the PUCCH allocation comprising two resource blocks in a frequency domain and comprising at least one orthogonal frequency division multiplexing (OFDM) symbol in a time domain.

AC. The method according to paragraph AB, wherein the at least one PDSCH transport block received by the user equipment comprises one transport block, the PUCCH allocation comprises a set of PUCCH resources, and the generated HARQ information report includes one bit that indicates a decoding status of the transport block; and performing NACK-only reporting comprises: selecting one PUCCH resource from the PUCCH allocation; and transmitting, to the serving node and via the even-numbered sub-carriers of the two transport blocks, one among up to a SC count of possible cyclic shift hopping pseudo-random sequences representing the HARQ information report through the selected PUCCH resource.

AD. The method according to paragraph AC, wherein the configured PUCCH count is less than the SC count, and one PUCCH resource outside of the PUCCH allocation is reserved as a reference resource.

AE. The method according to paragraph AC, wherein the selecting one PUCCH resource from the PUCCH allocation is based on random selection, based on at least a UE identifier, or based on an indication in downlink control information.

AF. The method according to paragraph AC, further comprising: determining a timing value corresponding to the selected PUCCH resource; and transmitting the HARQ information report through the selected PUCCH resource according to the timing value.

AG. The method according to paragraph AF, wherein determining a timing value corresponding to the selected PUCCH resource further comprises: receiving, from the serving node, a synchronization signal block (SSB) and/or a physical downlink shared channel; and determining the timing value corresponding to the selected PUCCH resource according to a receive timing of the SSB and/or physical downlink shared channel.

AH. The method according to paragraph AF, wherein determining a timing value corresponding to the selected PUCCH resource further comprises: receiving, from the serving node, a set of at least one timing value corresponding to a set of at least one range of reference signal received power (RSRP) values or thresholds; measuring a reference signal received power level; and determining the timing value corresponding to the selected PUCCH resource according to the measured reference signal received power level and the provided set of at least one range of reference signal received power values or thresholds; wherein the provided set of at least one timing value corresponding to the set of at least one range of RSRP values or thresholds are RRC configured and/or indicated in downlink control information (DCI).

AI. The method according to paragraph AF, wherein determining a timing value corresponding to the selected PUCCH resource further comprises: determining the timing value corresponding to a latest timing value provided by the serving node during a RRC connected state.

AJ. The method according to paragraph AF, wherein determining a timing value corresponding to the selected PUCCH resource further comprises: receiving, from the serving node, a timing offset between a global navigation satellite system (GNSS) timing and system frame or slot number or boundary; deriving a time stamp for a received downlink signal or channel; calculating a propagation delay according to the GNSS timing offset and the time stamp; and determining the timing value according to the propagation delay; wherein the GNSS timing offset is RRC configured or indicated in DCI.

AJ2. The method according to paragraph AC, further comprising: determining a power level corresponding to the selected PUCCH resource; and transmitting the HARQ information report through the selected PUCCH resource according to the power level.

AK. The method according to paragraph AJ2, wherein determining a power level corresponding to the selected PUCCH resource further comprises: receiving, from the serving node, at least one of a synchronization signal block (SSB) or a channel state information —reference signal (CSI-RS) and a transmitting power thereof; measuring a received power of the at least one of SSB or CSI-RS; calculating a pathloss according to at least the transmitting power and the received power of the at least one of SSB or CSI-RS; and determining the power level corresponding to the selected PUCCH resource according to at least the pathloss and a target received power; wherein the target received power is RRC configured or indicated in DCI by the serving node.

AL. The method according to paragraph AJ2, wherein determining a power level corresponding to the selected PUCCH resource further comprises: receiving, from the serving node, a range of transmission power levels and a set of corresponding RSRP threshold values; measuring a reference signal received power level; and determining the power level corresponding to the selected PUCCH resource according to the measured reference signal received power level and the set of RSRP threshold values.

AM. The method according to paragraph AJ2, wherein determining a power level corresponding to the selected PUCCH resource further comprises: determining the power level corresponding to a latest power level provided by the serving node during a RRC connected state.

AN. The method according to paragraph AB, wherein the at least one PDSCH transport block received by the user equipment comprises one transport block, the PUCCH allocation comprises a set of PUCCH resources, and the generated HARQ information report includes one bit that indicates a decoding status of the transport block; and performing NACK-only reporting comprises: selecting one PUCCH resource from the PUCCH allocation; and transmitting, to the serving node and via odd-numbered subcarriers of the two resource blocks, one among up to a SC count of possible cyclic shift hopping pseudo-random sequences representing the HARQ information report through the selected PUCCH resource.

AO. The method according to paragraph AN, wherein the configured PUCCH count is less than the SC count, and one PUCCH resource outside of the PUCCH allocation is reserved as a reference resource.

AP. The method according to paragraph AN, wherein the selecting one PUCCH resource from the PUCCH allocation is based on random selection, based on at least a UE identifier, or based on an indication in downlink control information.

AQ. The method according to paragraph AN, further comprising: determining a timing value corresponding to the selected PUCCH resource; and transmitting the HARQ information report through the selected PUCCH resource according to the timing value.

AR. The method according to paragraph AQ, wherein determining a timing value corresponding to the selected PUCCH resource further comprises: receiving, from the serving node, a synchronization signal block (SSB) and/or a physical downlink shared channel; and determining the timing value corresponding to the selected PUCCH resource according to a receive timing of the SSB and/or physical downlink shared channel.

AS. The method according to paragraph AQ, wherein determining a timing value corresponding to the selected PUCCH resource further comprises: receiving, from the serving node, a set of at least one timing value corresponding to a set of at least one range of reference signal received power (RSRP) values or thresholds; measuring a reference signal received power level; and determining the timing value corresponding to the selected PUCCH resource according to the measured reference signal received power level and the provided set of at least one range of reference signal received power values or thresholds; wherein the provided set of at least one timing value corresponding to the set of at least one range of RSRP values or thresholds are RRC configured and/or indicated in downlink control information (DCI).

AT. The method according to paragraph AQ, wherein determining a timing value corresponding to the selected PUCCH resource further comprises: determining the timing value corresponding to a latest timing value provided by the serving node during a RRC connected state.

AU. The method according to paragraph AQ, wherein determining a timing value corresponding to the selected PUCCH resource further comprises: receiving, from the serving node, a timing offset between a global navigation satellite system (GNSS) timing and system frame or slot number or boundary; deriving a time stamp for a received downlink signal or channel; calculating a propagation delay according to the GNSS timing offset and the time stamp; and determining the timing value according to the propagation delay; wherein the GNSS timing offset is RRC configured or indicated in DCI.

AV. The method according to paragraph AP, further comprising: determining a power level corresponding to the selected PUCCH resource; and transmitting the HARQ information report through the selected PUCCH resource according to the power level.

AW. The method according to paragraph AV, wherein determining a power level corresponding to the selected PUCCH resource further comprises: receiving, from the serving node, at least one of a synchronization signal block (SSB) or a channel state information —reference signal (CSI-RS) and a transmitting power thereof; measuring a received power of the at least one of SSB or CSI-RS; calculating a pathloss according to at least the transmitting power and the received power of the at least one of SSB or CSI-RS; and determining the power level corresponding to the selected PUCCH resource according to at least the pathloss and a target received power; wherein the target received power is RRC configured or indicated in DCI by the serving node.

AX. The method according to paragraph AV, wherein determining a power level corresponding to the selected PUCCH resource further comprises: receiving, from the serving node, a range of transmission power levels and a set of corresponding RSRP threshold values; measuring a reference signal received power level; and determining the power level corresponding to the selected PUCCH resource according to the measured reference signal received power level and the set of RSRP threshold values.

AY. The method according to paragraph AV, wherein determining a power level corresponding to the selected PUCCH resource further comprises: determining the power level corresponding to a latest power level provided by the serving node during a RRC connected state.

AZ. The method according to paragraph AB, wherein the at least one PDSCH transport block received by the user equipment comprises two transport blocks, and the PUCCH allocation comprises three subsets of PUCCH resources, each subset of PUCCH resources being designated for transmitting the HARQ information report according to decoding status of the two transport blocks.

BA. The method according to paragraph AZ, wherein a first subset of PUCCH resources is designated for transmitting the HARQ information report indicating a first transport block being decoded erroneously; a second subset of PUCCH resources is designated for transmitting the HARQ information report indicating a second transport block being decoded erroneously, and a third subset of PUCCH resources is designated for transmitting the HARQ information report indicating the first transport block and the second transport block being decoded erroneously.

BB. The method according to paragraph BA, further comprising: generating the HARQ information report including two bits that indicate the decoding status of the two transport blocks; determining a subset of PUCCH resources from the three subsets of PUCCH resources according to the decoding status of the two transport blocks; selecting one PUCCH resource from the determined subset of PUCCH resources; and transmitting, to the serving node and via the even-numbered sub-carriers of the two transport blocks, one among up to a SC count of possible cyclic shift hopping pseudo-random sequences representing the HARQ information report through the selected PUCCH resource.

BC. The method according to paragraph BB, further comprising: determining a timing value corresponding to the selected PUCCH resource; and transmitting the HARQ information report through the selected PUCCH resource according to the timing value.

BD. The method according to paragraph BC, wherein determining a timing value corresponding to the selected PUCCH resource further comprises: receiving, from the serving node, a synchronization signal block (SSB) and/or a physical downlink shared channel; and determining the timing value corresponding to the selected PUCCH resource according to a receive timing of the SSB and/or physical downlink shared channel.

BE. The method according to paragraph BC, wherein determining a timing value corresponding to the selected PUCCH resource further comprises: receiving, from the serving node, a set of at least one timing value corresponding to a set of at least one range of reference signal received power (RSRP) values or thresholds; measuring a reference signal received power level; and determining the timing value corresponding to the selected PUCCH resource according to the measured reference signal received power level and the provided set of at least one range of reference signal received power values or thresholds; wherein the provided set of at least one timing value corresponding to the set of at least one range of RSRP values or thresholds are RRC configured and/or indicated in downlink control information (DCI).

BF. The method according to paragraph BC, wherein determining a timing value corresponding to the selected PUCCH resource further comprises: determining the timing value corresponding to a latest timing value provided by the serving node during a RRC connected state.

BG. The method according to paragraph BC, wherein determining a timing value corresponding to the selected PUCCH resource further comprises: receiving, from the serving node, a timing offset between a global navigation satellite system (GNSS) timing and system frame or slot number or boundary; deriving a time stamp for a received downlink signal or channel; calculating a propagation delay according to the GNSS timing offset and the time stamp; and determining the timing value according to the propagation delay; wherein the GNSS timing offset is RRC configured or indicated in DCI.

BH. The method according to paragraph BB, further comprising: determining a power level corresponding to the selected PUCCH resource; and transmitting the HARQ information report through the selected PUCCH resource according to the power level.

BI. The method according to paragraph BH, wherein determining a power level corresponding to the selected PUCCH resource further comprises: receiving, from the serving node, at least one of a synchronization signal block (SSB) or a channel state information —reference signal (CSI-RS) and a transmitting power thereof; measuring a received power of the at least one of SSB or CSI-RS; calculating a pathloss according to at least the transmitting power and the received power of the at least one of SSB or CSI-RS; and determining the power level corresponding to the selected PUCCH resource according to at least the pathloss and a target received power; wherein the target received power is RRC configured or indicated in DCI by the serving node.

BJ. The method according to paragraph BH, wherein determining a power level corresponding to the selected PUCCH resource further comprises: receiving, from the serving node, a range of transmission power levels and a set of corresponding RSRP threshold values; measuring a reference signal received power level; and determining the power level corresponding to the selected PUCCH resource according to the measured reference signal received power level and the set of RSRP threshold values.

BK. The method according to paragraph BH, wherein determining a power level corresponding to the selected PUCCH resource further comprises: determining the power level corresponding to a latest power level provided by the serving node during a RRC connected state.

BL. The method according to paragraph AB, wherein the at least one PDSCH transport block received by the user equipment comprises two transport blocks, and the configured PUCCH allocation comprises three subsets of PUCCH resources, each subset of PUCCH resources being designated for transmitting the HARQ information report according to decoding status of the two transport blocks.

BM. The method according to paragraph BL, wherein a first subset of PUCCH resources is designated for transmitting the HARQ information report indicating a first transport block being decoded erroneously; a second subset of PUCCH resources is designated for transmitting the HARQ information report indicating a second transport block being decoded erroneously, and a third subset of PUCCH resources is designated for transmitting the HARQ information report indicating the first transport block and the second transport block being decoded erroneously.

BN. The method according to paragraph BL, further comprising: generating the HARQ information report including two bits that indicate the decoding status of the two transport blocks; determining a subset of PUCCH resources from the three subsets of PUCCH resources according to the decoding status of the two transport blocks; selecting one PUCCH resource from the determined subset of PUCCH resources; and transmitting, to the serving node and via odd-numbered sub-carriers of the two transport blocks, one among up to a SC count of possible cyclic shift hopping pseudo-random sequences representing the HARQ information report through the selected PUCCH resource.

BO. The method according to paragraph BN, further comprising: determining a timing value corresponding to the selected PUCCH resource; and transmitting the HARQ information report through the selected PUCCH resource according to the timing value.

BP. The method according to paragraph BO, wherein determining a timing value corresponding to the selected PUCCH resource further comprises: receiving, from the serving node, a synchronization signal block (SSB) in a physical downlink shared channel; and determining the timing value corresponding to the selected PUCCH resource according to a receive timing of the SSB and/or physical downlink shared channel.

BQ. The method according to paragraph BO, wherein determining a timing value corresponding to the selected PUCCH resource further comprises: receiving, from the serving node, a set of at least one timing value corresponding to a set of at least one range of reference signal received power (RSRP) values or thresholds; measuring a reference signal received power level; and determining the timing value corresponding to the selected PUCCH resource according to the measured reference signal received power level and the provided set of at least one range of reference signal received power values or thresholds; wherein the provided set of at least one timing value corresponding to the set of at least one range of RSRP values or thresholds are RRC configured and/or indicated in downlink control information (DCI).

BR. The method according to paragraph BO, wherein determining a timing value corresponding to the selected PUCCH resource further comprises: determining the timing value corresponding to a latest timing value provided by the serving node during a RRC connected state.

BS. The method according to paragraph BP, wherein determining a timing value corresponding to the selected PUCCH resource further comprises: receiving, from the serving node, a timing offset between a global navigation satellite system (GNSS) timing and system frame or slot number or boundary; deriving a time stamp for a received downlink signal or channel; calculating a propagation delay according to the GNSS timing offset and the time stamp; and determining the timing value according to the propagation delay; wherein the GNSS timing offset is RRC configured or indicated in DCI.

BT. The method according to paragraph BN, further comprising: determining a power level corresponding to the selected PUCCH resource; and transmitting the HARQ information report through the selected PUCCH resource according to the power level.

BU. The method according to paragraph BT, wherein determining a power level corresponding to the selected PUCCH resource further comprises: receiving, from the serving node, at least one of a synchronization signal block (SSB) or a channel state information —reference signal (CSI-RS) and a transmitting power thereof; measuring a received power of the at least one of SSB or CSI-RS; calculating a pathloss according to at least the transmitting power and the received power of the at least one of SSB or CSI-RS; and determining the power level corresponding to the selected PUCCH resource according to at least the pathloss and a target received power; wherein the target received power is RRC configured or indicated in DCI by the serving node.

BV. The method according to paragraph BT, wherein determining a power level corresponding to the selected PUCCH resource further comprises: receiving, from the serving node, a range of transmission power levels and a set of corresponding RSRP threshold values; measuring a reference signal received power level; and determining the power level corresponding to the selected PUCCH resource according to the measured reference signal received power level and the set of RSRP threshold values.

BW. The method according to paragraph BT, wherein determining a power level corresponding to the selected PUCCH resource further comprises: determining the power level corresponding to a latest power level provided by the serving node during a RRC connected state.

BX. One or more computer readable media storing thereon computer-readable instructions that, when executed by one or more processors of a user equipment (UE), cause the one or more processors to perform operations, the operations comprising: receiving, from a serving node and via a new radio (NR) radio access network (RAN), at least one physical downlink shared channel (PDSCH) transport block; determining that a first PDSCH transport block is decoded erroneously during a UE radio resource control (RRC) idle state or a UE RRC inactive state; generating a hybrid automatic repeat request (HARQ) information report indicating a negative acknowledgement (NACK) of the first PDSCH transport block; and performing NACK-only reporting to the serving node.

BY. The one or more computer readable media according to paragraph BX, wherein the operations further comprise: determining that a second PDSCH transport block is decoded correctly or is not decoded; and determining not generating a HARQ information report indicating an acknowledgement (ACK) of the second PDSCH transport block.

BZ. The one or more computer readable media according to paragraph BX or BY, wherein the operations further comprise: providing, from the serving node and via the NR radio access network, a physical uplink control channel (PUCCH) resource allocation for transmitting the HARQ information report, wherein a PUCCH resource of the PUCCH allocation is configured at the serving node to comprise one resource block in a frequency domain and comprising at least one orthogonal frequency division multiplexing (OFDM) symbol in a time domain via system information block and/or indicated in downlink control information.

CA. The one or more computer readable media according to paragraph BZ, wherein the at least one PDSCH transport block received by the user equipment comprises one transport block, the PUCCH allocation comprises a set of PUCCH resources, and the generated HARQ information report includes one bit that indicates a decoding status of the transport block; and performing NACK-only reporting comprises: selecting one PUCCH resource from the PUCCH allocation; and transmitting, to the serving node, one among up to a SC count of possible cyclic shift hopping pseudo-random sequences representing the HARQ information report through the selected PUCCH resource.

CB. The one or more computer readable media according to paragraph CA, wherein configured PUCCH count is less than the SC count, and one PUCCH resource outside of the PUCCH allocation is reserved as a reference resource.

CC. The one or more computer readable media according to paragraph CA, wherein the selecting one PUCCH resource from the PUCCH allocation is based on random selection, based on at least a UE identifier, or based on an indication in downlink control information (DCI).

CD. The one or more computer readable media according to paragraph CA, wherein the operations further comprise: determining a timing value corresponding to the selected PUCCH resource; and transmitting the HARQ information report through the selected PUCCH resource according to the timing value.

CE. The one or more computer readable media according to paragraph CD, wherein determining a timing value corresponding to the selected PUCCH resource further comprises: receiving, from the serving node, a synchronization signal block (SSB) and/or a physical downlink shared channel; and determining the timing value corresponding to the selected PUCCH resource according to a receive timing of the SSB and/or physical downlink shared channel.

CF. The one or more computer readable media according to paragraph CD, wherein determining a timing value corresponding to the selected PUCCH resource further comprises: receiving, from the serving node, a set of at least one timing value corresponding to a set of at least one range of reference signal received power (RSRP) values or thresholds; measuring a reference signal received power level; and determining the timing value corresponding to the selected PUCCH resource according to the measured reference signal received power level and the provided set of at least one range of reference signal received power values or thresholds; wherein the provided set of at least one timing value corresponding to the set of at least one range of RSRP values or thresholds are RRC configured and/or indicated in downlink control information (DCI).

CG. The one or more computer readable media according to paragraph CD, wherein determining a timing value corresponding to the selected PUCCH resource further comprises: determining the timing value corresponding to a latest timing value provided by the serving node during a RRC connected state.

CH. The one or more computer readable media according to paragraph CD, wherein determining a timing value corresponding to the selected PUCCH resource further comprises: receiving, from the serving node, a timing offset between a global navigation satellite system (GNSS) timing and system frame or slot number or boundary; deriving a time stamp for a received downlink signal or channel; calculating a propagation delay according to the GNSS timing offset and the time stamp; and determining the timing value according to the propagation delay, wherein the GNSS timing offset is RRC configured or indicated in DCI.

CI. The one or more computer readable media according to paragraph CA, wherein the operations further comprise: determining a power level corresponding to the selected PUCCH resource; and transmitting the HARQ information report through the selected PUCCH resource according to the power level.

CJ. The one or more computer readable media according to paragraph CI, wherein determining a power level corresponding to the selected PUCCH resource further comprises: receiving, from the serving node, at least one of a synchronization signal block (SSB) or a channel state information—reference signal (CSI-RS) and a transmitting power thereof; measuring a received power of the at least one of SSB or CSI-RS; calculating a pathloss according to at least the transmitting power and the receiving power of the at least one of SSB or CSI-RS; and determining the power level corresponding to the selected PUCCH resource according to at least the pathloss and a target received power, wherein the target received power is RRC configured or indicated in DCI by the serving node.

CK. The one or more computer readable media according to paragraph CI, wherein determining a power level corresponding to the selected PUCCH resource further comprises: receiving, from the serving node, a range of transmission power levels and a set of corresponding RSRP threshold values; measuring a reference signal received power level; and determining the power level corresponding to the selected PUCCH resource according to the measured reference signal received power level and the set of RSRP threshold values.

CL. The one or more computer readable media according to paragraph CI, wherein determining a power level corresponding to the selected PUCCH resource further comprises: determining the power level corresponding to a latest power level provided by the serving node during a RRC connected state.

CM. The one or more computer readable media according to paragraph BY or BZ, wherein the at least one PDSCH transport block received by the user equipment comprises two transport blocks, and the configured PUCCH allocation comprises three subsets of PUCCH resources, each subset of PUCCH resources being designated for transmitting the HARQ information report according to decoding status of the two transport blocks.

CN. The one or more computer readable media according to paragraph CM, wherein a first subset of PUCCH resources is designated for transmitting the HARQ information report indicating a first transport block being decoded erroneously; a second subset of PUCCH resources is designated for transmitting the HARQ information report indicating a second transport block being decoded erroneously; and a third subset of PUCCH resources is designated for transmitting the HARQ information report indicating the first transport block and the second transport block being decoded erroneously.

CO. The one or more computer readable media according to paragraph CM, wherein the operations further comprise: generating the HARQ information report including two bits that indicate the decoding status of the two transport blocks; determining a subset of PUCCH resources from the three subsets of PUCCH resources according to the decoding status of the two transport blocks; selecting one PUCCH resource from the determined subset of PUCCH resources; and transmitting, to the serving node, one among up to a SC count of possible cyclic shift hopping pseudo-random sequences representing the HARQ information report through the selected PUCCH resource.

CP. The one or more computer readable media according to paragraph CO, wherein the operations further comprise: determining a timing value corresponding to the selected PUCCH resource; and transmitting the HARQ information report through the selected PUCCH resource according to the timing value.

CQ. The one or more computer readable media according to paragraph CP, wherein determining a timing value corresponding to the selected PUCCH resource further comprises: receiving, from the serving node, a synchronization signal block (SSB) and/or a physical downlink shared channel; and determining the timing value corresponding to the selected PUCCH resource according to a receive timing of the SSB and/or physical downlink shared channel.

CR. The one or more computer readable media according to paragraph CP, wherein determining a timing value corresponding to the selected PUCCH resource further comprises: receiving, from the serving node, a set of at least one timing value corresponding to a set of at least one range of reference signal received power (RSRP) values or thresholds; measuring a reference signal received power level; and determining the timing value corresponding to the selected PUCCH resource according to the measured reference signal received power level and the provided set of at least one range of reference signal received power values or thresholds.

CS. The one or more computer readable media according to paragraph CP, wherein determining a timing value corresponding to the selected PUCCH resource further comprises: determining the timing value corresponding to a latest timing value provided by the serving node during a RRC connected state.

CT. The one or more computer readable media according to paragraph CP, wherein determining a timing value corresponding to the selected PUCCH resource further comprises: receiving, from the serving node, a timing offset between a global navigation satellite system (GNSS) timing and system frame or slot number or boundary; deriving a time stamp for a received downlink signal or channel; calculating a propagation delay according to the GNSS timing offset and the time stamp; and determining the timing value according to the propagation delay; wherein the GNSS timing offset is RRC configured or indicated in DCI.

CU. The one or more computer readable media according to paragraph CO, wherein the operations further comprise: determining a power level corresponding to the selected PUCCH resource; and transmitting the HARQ information report through the selected PUCCH resource according to the power level.

CV. The one or more computer readable media according to paragraph CU, wherein determining a power level corresponding to the selected PUCCH resource further comprises: receiving, from the serving node, at least one of a synchronization signal block (SSB) or a channel state information—reference signal (CSI-RS) and a transmitting power thereof; measuring a received power of the at least one of SSB or CSI-RS; calculating a pathloss according to at least the transmitting power and the received power of the at least one of SSB or CSI-RS; and determining the power level corresponding to the selected PUCCH resource according to at least the pathloss and a target received power; wherein the target received power is RRC configured or indicated in DCI by the serving node.

CW. The one or more computer readable media according to paragraph CU, wherein determining a power level corresponding to the selected PUCCH resource further comprises: receiving, from the serving node, a range of transmission power levels and a set of corresponding RSRP threshold levels; measuring a reference signal received power level; and determining the power level corresponding to the selected PUCCH resource according to the measured reference signal received power level and the set of RSRP threshold levels.

CX. The one or more computer readable media according to paragraph CU, wherein determining a power level corresponding to the selected PUCCH resource further comprises: determining the power level corresponding to a latest power level provided by the serving node during an RRC connected state.

CY. The one or more computer readable media according to paragraph BY or BZ, wherein a PUCCH allocation to the UE configured at the serving node includes a set of PUCCH resources, a PUCCH resource of the PUCCH allocation comprising two resource blocks in a frequency domain and comprising at least one orthogonal frequency division multiplexing (OFDM) symbol in a time domain.

CZ. The one or more computer readable media according to paragraph CY, wherein the at least one PDSCH transport block received by the user equipment comprises one transport block, the PUCCH allocation comprises a set of PUCCH resources, and the generated HARQ information report includes one bit that indicates a decoding status of the transport block; and performing NACK-only reporting comprises: selecting one PUCCH resource from the PUCCH allocation; and transmitting, to the serving node and via the even-numbered sub-carriers of the two transport blocks, one among up to a SC count of possible cyclic shift hopping pseudo-random sequences representing the HARQ information report through the selected PUCCH resource.

DA. The one or more computer readable media according to paragraph CZ, wherein configured PUCCH count is less than the SC count, and one PUCCH resource outside of the PUCCH allocation is reserved as a reference resource.

DB. The one or more computer readable media according to paragraph CZ, wherein the selecting one PUCCH resource from the PUCCH allocation is based on random selection, based on at least a UE identifier, or based on an indication in downlink control information.

DC. The one or more computer readable media according to paragraph CZ, wherein the operations further comprise: determining a timing value corresponding to the selected PUCCH resource; and transmitting the HARQ information report through the selected PUCCH resource according to the timing value.

DD. The one or more computer readable media according to paragraph DC, wherein determining a timing value corresponding to the selected PUCCH resource further comprises: receiving, from the serving node, a synchronization signal block (SSB) and/or a physical downlink shared channel; and determining the timing value corresponding to the selected PUCCH resource according to a receive timing of the SSB and/or physical downlink shared channel.

DE. The one or more computer readable media according to paragraph DC, wherein determining a timing value corresponding to the selected PUCCH resource further comprises: receiving, from the serving node, a set of at least one timing value corresponding to a set of at least one range of reference signal received power (RSRP) values or thresholds; measuring a reference signal received power level; and determining the timing value corresponding to the selected PUCCH resource according to the measured reference signal received power level and the provided set of at least one range of reference signal received power values or thresholds; wherein the provided set of at least one timing value corresponding to the set of at least one range of RSRP values or thresholds are RRC configured and/or indicated in downlink control information (DCI).

DF. The one or more computer readable media according to paragraph DC, wherein determining a timing value corresponding to the selected PUCCH resource further comprises: determining the timing value corresponding to a latest timing value provided by the serving node during a RRC connected state.

DG. The one or more computer readable media according to paragraph DC, wherein determining a timing value corresponding to the selected PUCCH resource further comprises: receiving, from the serving node, a timing offset between a global navigation satellite system (GNSS) timing and system frame or slot number or boundary; deriving a time stamp for a received downlink signal or channel; calculating a propagation delay according to the GNSS timing offset and the time stamp; and determining the timing value according to the propagation delay; wherein the GNSS timing offset is RRC configured or indicated in DCI.

DH. The one or more computer readable media according to paragraph CZ, wherein the operations further comprise: determining a power level corresponding to the selected PUCCH resource; and transmitting the HARQ information report through the selected PUCCH resource according to the power level.

DI. The one or more computer readable media according to paragraph DH, wherein determining a power level corresponding to the selected PUCCH resource further comprises: receiving, from the serving node, at least one of a synchronization signal block (SSB) or a channel state information—reference signal (CSI-RS) and a transmitting power thereof; measuring a received power of the at least one of SSB or CSI-RS; calculating a pathloss according to at least the transmitting power and the received power of the at least one of SSB or CSI-RS; and determining the power level corresponding to the selected PUCCH resource according to at least the pathloss and a target received power; wherein the target received power is RRC configured or indicated in DCI by the serving node.

DJ. The one or more computer readable media according to paragraph DH, wherein determining a power level corresponding to the selected PUCCH resource further comprises: receiving, from the serving node, a range of transmission power levels and a set of corresponding RSRP threshold values; measuring a reference signal received power level; and determining the power level corresponding to the selected PUCCH resource according to the measured reference signal received power level and the set of RSRP threshold values.

DK. The one or more computer readable media according to paragraph DH, wherein determining a power level corresponding to the selected PUCCH resource further comprises: determining the power level corresponding to a latest power level provided by the serving node during a RRC connected state.

DL. The one or more computer readable media according to paragraph CZ, wherein the at least one PDSCH transport block received by the user equipment comprises one transport block, the PUCCH allocation comprises a set of PUCCH resources, and the generated HARQ information report includes one bit that indicates a decoding status of the transport block; and performing NACK-only reporting comprises: selecting one PUCCH resource from the PUCCH allocation; and transmitting, to the serving node and via odd-numbered sub-carriers of the two resource blocks, one among up to a SC count of possible cyclic shift hopping pseudo-random sequences representing the HARQ information report through the selected PUCCH resource.

DM. The one or more computer readable media according to paragraph DL, wherein configured PUCCH count is less than the SC count, and one PUCCH resource outside of the PUCCH allocation is reserved as a reference resource.

DN. The one or more computer readable media according to paragraph DL, wherein the selecting one PUCCH resource from the PUCCH allocation is based on random selection, based on at least a UE identifier, or based on an indication in downlink control information.

DO. The one or more computer readable media according to paragraph DL, wherein the operations further comprise: determining a timing value corresponding to the selected PUCCH resource; and transmitting the HARQ information report through the selected PUCCH resource according to the timing value.

DP. The one or more computer readable media according to paragraph DO, wherein determining a timing value corresponding to the selected PUCCH resource further comprises: receiving, from the serving node, a synchronization signal block (SSB) and/or a physical downlink shared channel; and determining the timing value corresponding to the selected PUCCH resource according to a receive timing of the SSB and/or physical downlink shared channel.

DQ. The one or more computer readable media according to paragraph DO, wherein determining a timing value corresponding to the selected PUCCH resource further comprises: receiving, from the serving node, a set of at least one timing value corresponding to a set of at least one range of reference signal received power (RSRP) values or thresholds; measuring a reference signal received power level; and determining the timing value corresponding to the selected PUCCH resource according to the measured reference signal received power level and the provided set of at least one range of reference signal received power values or thresholds; wherein the provided set of at least one timing value corresponding to the set of at least one range of RSRP values or thresholds are RRC configured and/or indicated in downlink control information (DCI).

DR. The one or more computer readable media according to paragraph DO, wherein determining a timing value corresponding to the selected PUCCH resource further comprises: determining the timing value corresponding to a latest timing value provided by the serving node during a RRC connected state.

DS. The one or more computer readable media according to paragraph DO, wherein determining a timing value corresponding to the selected PUCCH resource further comprises: receiving, from the serving node, a timing offset between a global navigation satellite system (GNSS) timing and system frame or slot number or boundary; deriving a time stamp for a received downlink signal or channel; calculating a propagation delay according to the GNSS timing offset and the time stamp; and determining the timing value according to the propagation delay; wherein the GNSS timing offset is RRC configured or indicated in DCI.

DT. The one or more computer readable media according to paragraph DN, wherein the operations further comprise: determining a power level corresponding to the selected PUCCH resource; and transmitting the HARQ information report through the selected PUCCH resource according to the power level.

DU. The one or more computer readable media according to paragraph DT, wherein determining a power level corresponding to the selected PUCCH resource further comprises: receiving, from the serving node, at least one of a synchronization signal block (SSB) or a channel state information—reference signal (CSI-RS) and a transmitting power thereof; measuring a received power of the at least one of SSB or CSI-RS; calculating a pathloss according to at least the transmitting power and the received power of the at least one of SSB or CSI-RS; and determining the power level corresponding to the selected PUCCH resource according to at least the pathloss and a target received power; wherein the target received power is RRC configured or indicated in DCI by the serving node.

DV. The one or more computer readable media according to paragraph DT, wherein determining a power level corresponding to the selected PUCCH resource further comprises: receiving, from the serving node, a range of transmission power levels and a set of corresponding RSRP threshold values; measuring a reference signal received power level; and determining the power level corresponding to the selected PUCCH resource according to the measured reference signal received power level and the set of RSRP threshold values.

DW. The one or more computer readable media according to paragraph DT, wherein determining a power level corresponding to the selected PUCCH resource further comprises: determining the power level corresponding to a latest power level provided by the serving node during a RRC connected state.

DX. The one or more computer readable media according to paragraph CZ, wherein the at least one PDSCH transport block received by the user equipment comprises two transport blocks, and the PUCCH allocation comprises three subsets of PUCCH resources, each subset of PUCCH resources being designated for transmitting the HARQ information report according to decoding status of the two transport blocks.

DY. The one or more computer readable media according to paragraph DZ, wherein a first subset of PUCCH resources is designated for transmitting the HARQ information report indicating a first transport block being decoded erroneously; a second subset of PUCCH resources is designated for transmitting the HARQ information report indicating a second transport block being decoded erroneously, and a third subset of PUCCH resources is designated for transmitting the HARQ information report indicating the first transport block and the second transport block being decoded erroneously.

DZ. The one or more computer readable media according to paragraph DX, wherein the operations further comprise: generating the HARQ information report including two bits that indicate the decoding status of the two transport blocks; determining a subset of PUCCH resources from the three subsets of PUCCH resources according to the decoding status of the two transport blocks; selecting one PUCCH resource from the determined subset of PUCCH resources; and transmitting, to the serving node and via the even-numbered sub-carriers of the two transport blocks, one among up to a SC count of possible cyclic shift hopping pseudo-random sequences representing the HARQ information report through the selected PUCCH resource.

EA. The one or more computer readable media according to paragraph DZ, wherein the operations further comprise: determining a timing value corresponding to the selected PUCCH resource; and transmitting the HARQ information report through the selected PUCCH resource according to the timing value.

EB. The one or more computer readable media according to paragraph EA, wherein determining a timing value corresponding to the selected PUCCH resource further comprises: receiving, from the serving node, a synchronization signal block (SSB) and/or a physical downlink shared channel; and determining the timing value corresponding to the selected PUCCH resource according to a receive timing of the SSB and/or physical downlink shared channel.

EC. The one or more computer readable media according to paragraph EA, wherein determining a timing value corresponding to the selected PUCCH resource further comprises: receiving, from the serving node, a set of at least one timing value corresponding to a set of at least one range of reference signal received power (RSRP) values or thresholds; measuring a reference signal received power level; and determining the timing value corresponding to the selected PUCCH resource according to the measured reference signal received power level and the provided set of at least one range of reference signal received power values or thresholds; wherein the provided set of at least one timing value corresponding to the set of at least one range of RSRP values or thresholds are RRC configured and/or indicated in downlink control information (DCI).

ED. The one or more computer readable media according to paragraph EA, wherein determining a timing value corresponding to the selected PUCCH resource further comprises: determining the timing value corresponding to a latest timing value provided by the serving node during a RRC connected state.

EE. The one or more computer readable media according to paragraph EA, wherein determining a timing value corresponding to the selected PUCCH resource further comprises: receiving, from the serving node, a timing offset between a global navigation satellite system (GNSS) timing and system frame or slot number or boundary; deriving a time stamp for a received downlink signal or channel; calculating a propagation delay according to the GNSS timing offset and the time stamp; and determining the timing value according to the propagation delay; wherein the GNSS timing offset is RRC configured or indicated in DCI.

EF. The one or more computer readable media according to paragraph DZ, wherein the operations further comprise: determining a power level corresponding to the selected PUCCH resource; and transmitting the HARQ information report through the selected PUCCH resource according to the power level.

EG. The one or more computer readable media according to paragraph EF, wherein determining a power level corresponding to the selected PUCCH resource further comprises: receiving, from the serving node, at least one of a synchronization signal block (SSB) or a channel state information—reference signal (CSI-RS) and a transmitting power thereof; measuring a received power of the at least one of SSB or CSI-RS; calculating a pathloss according to at least the transmitting power and the received power of the at least one of SSB or CSI-RS; and determining the power level corresponding to the selected PUCCH resource according to at least the pathloss and a target received power; wherein the target received power is RRC configured or indicated in DCI by the serving node.

EH. The one or more computer readable media according to paragraph EF, wherein determining a power level corresponding to the selected PUCCH resource further comprises: receiving, from the serving node, a range of transmission power levels and a set of corresponding RSRP threshold values; measuring a reference signal received power level; and determining the power level corresponding to the selected PUCCH resource according to the measured reference signal received power level and the set of RSRP threshold values.

EL. The one or more computer readable media according to paragraph EF, wherein determining a power level corresponding to the selected PUCCH resource further comprises: determining the power level corresponding to a latest power level provided by the serving node during a RRC connected state.

EJ. The one or more computer readable media according to paragraph CZ, wherein the at least one PDSCH transport block received by the user equipment comprises two transport blocks, and the configured PUCCH allocation comprises three subsets of PUCCH resources, each subset of PUCCH resources being designated for transmitting the HARQ information report according to decoding status of the two transport blocks.

EK. The one or more computer readable media according to paragraph EJ, wherein a first subset of PUCCH resources is designated for transmitting the HARQ information report indicating a first transport block being decoded erroneously; a second subset of PUCCH resources is designated for transmitting the HARQ information report indicating a second transport block being decoded erroneously, and a third subset of PUCCH resources is designated for transmitting the HARQ information report indicating the first transport block and the second transport block being decoded erroneously.

EL. The one or more computer readable media according to paragraph EJ, wherein the operations further comprise: generating the HARQ information report including two bits that indicate the decoding status of the two transport blocks; determining a subset of PUCCH resources from the three subsets of PUCCH resources according to the decoding status of the two transport blocks; selecting one PUCCH resource from the determined subset of PUCCH resources; and transmitting, to the serving node and via odd-numbered sub-carriers of the two transport blocks, one among up to a SC count of possible cyclic shift hopping pseudo-random sequences representing the HARQ information report through the selected PUCCH resource.

EM. The one or more computer readable media according to paragraph EL, wherein the operations further comprise: determining a timing value corresponding to the selected PUCCH resource; and transmitting the HARQ information report through the selected PUCCH resource according to the timing value.

EN. The one or more computer readable media according to paragraph EM, wherein determining a timing value corresponding to the selected PUCCH resource further comprises: receiving, from the serving node, a synchronization signal block (SSB) in a physical downlink shared channel; and determining the timing value corresponding to the selected PUCCH resource according to a receive timing of the SSB and/or physical downlink shared channel.

EO. The one or more computer readable media according to paragraph EM, wherein determining a timing value corresponding to the selected PUCCH resource further comprises: receiving, from the serving node, a set of at least one timing value corresponding to a set of at least one range of reference signal received power (RSRP) values or thresholds; measuring a reference signal received power level; and determining the timing value corresponding to the selected PUCCH resource according to the measured reference signal received power level and the provided set of at least one range of reference signal received power values or thresholds; wherein the provided set of at least one timing value corresponding to the set of at least one range of RSRP values or thresholds are RRC configured and/or indicated in downlink control information (DCI).

EP. The one or more computer readable media according to paragraph EM, wherein determining a timing value corresponding to the selected PUCCH resource further comprises: determining the timing value corresponding to a latest timing value provided by the serving node during a RRC connected state.

EQ. The one or more computer readable media according to paragraph EN, wherein determining a timing value corresponding to the selected PUCCH resource further comprises: receiving, from the serving node, a timing offset between a global navigation satellite system (GNSS) timing and system frame or slot number or boundary; deriving a time stamp for a received downlink signal or channel; calculating a propagation delay according to the GNSS timing offset and the time stamp; and determining the timing value according to the propagation delay; wherein the GNSS timing offset is RRC configured or indicated in DCI.

ER. The one or more computer readable media according to paragraph EL, wherein the operations further comprise: determining a power level corresponding to the selected PUCCH resource; and transmitting the HARQ information report through the selected PUCCH resource according to the power level.

ES. The one or more computer readable media according to paragraph ER, wherein determining a power level corresponding to the selected PUCCH resource further comprises: receiving, from the serving node, at least one of a synchronization signal block (SSB) or a channel state information—reference signal (CSI-RS) and a transmitting power thereof; measuring a received power of the at least one of SSB or CSI-RS; calculating a pathloss according to at least the transmitting power and the received power of the at least one of SSB or CSI-RS; and determining the power level corresponding to the selected PUCCH resource according to at least the pathloss and a target received power; wherein the target received power is RRC configured or indicated in DCI by the serving node.

ET. The one or more computer readable media according to paragraph ER, wherein determining a power level corresponding to the selected PUCCH resource further comprises: receiving, from the serving node, a range of transmission power levels and a set of corresponding RSRP threshold values; measuring a reference signal received power level; and determining the power level corresponding to the selected PUCCH resource according to the measured reference signal received power level and the set of RSRP threshold values.

EU. The one or more computer readable media according to paragraph ER, wherein determining a power level corresponding to the selected PUCCH resource further comprises: determining the power level corresponding to a latest power level provided by the serving node during a RRC connected state.

EV. A user equipment (UE) comprising: one or more processors; and memory coupled to the one or more processors, the memory storing thereon computer-readable instructions that, when executed by the one or more processors, cause the one or more processors to perform operations, the operations comprising: receiving, from a serving node and via a new radio (NR) radio access network (RAN), at least one physical downlink shared channel (PDSCH) transport block; determining that a first PDSCH transport block is decoded erroneously during a UE radio resource control (RRC) idle state or a UE RRC inactive state; generating a hybrid automatic repeat request (HARQ) information report indicating a negative acknowledgement (NACK) of the first PDSCH transport block; and performing NACK-only reporting to the serving node.

EW. The UE according to paragraph EV, wherein the operations further comprise: determining that a second PDSCH transport block is decoded correctly or is not decoded; and determining not generating a HARQ information report indicating an acknowledgement (ACK) of the second PDSCH transport block.

EX. The UE according to paragraph EV or EW, wherein the operations further comprise: providing, from the serving node and via the NR radio access network, a physical uplink control channel (PUCCH) resource allocation for transmitting the HARQ information report, wherein a PUCCH resource of the PUCCH allocation is configured at the serving node to comprise one resource block in a frequency domain and comprising at least one orthogonal frequency division multiplexing (OFDM) symbol in a time domain via system information block and/or indicated in downlink control information.

EY. The UE according to paragraph EX, wherein the at least one PDSCH transport block received by the user equipment comprises one transport block, the PUCCH allocation comprises a set of PUCCH resources, and the generated HARQ information report includes one bit that indicates a decoding status of the transport block; and performing NACK-only reporting comprises: selecting one PUCCH resource from the PUCCH allocation; and transmitting, to the serving node, one among up to a SC count of possible cyclic shift hopping pseudo-random sequences representing the HARQ information report through the selected PUCCH resource.

EZ. The UE according to paragraph EY, wherein configured PUCCH count is less than the SC count, and one PUCCH resource outside of configured set of PUCCH resources is reserved as a reference resource.

FA. The UE according to paragraph EY, wherein the selecting one PUCCH resource from the PUCCH allocation is based on random selection, based on at least a UE identifier, or based on an indication in downlink control information (DCI).

FB. The UE according to paragraph EY, wherein the operations further comprise: determining a timing value corresponding to the selected PUCCH resource; and transmitting the HARQ information report through the selected PUCCH resource according to the timing value.

FC. The UE according to paragraph FB, wherein determining a timing value corresponding to the selected PUCCH resource further comprises: receiving, from the serving node, a synchronization signal block (SSB) and/or a physical downlink shared channel; and determining the timing value corresponding to the selected PUCCH resource according to a receive timing of the SSB and/or physical downlink shared channel.

FD. The UE according to paragraph FB, wherein determining a timing value corresponding to the selected PUCCH resource further comprises: receiving, from the serving node, a set of at least one timing value corresponding to a set of at least one range of reference signal received power (RSRP) values or thresholds; measuring a reference signal received power level; and determining the timing value corresponding to the selected PUCCH resource according to the measured reference signal received power level and the provided set of at least one range of reference signal received power values or thresholds; wherein the provided set of at least one timing value corresponding to the set of at least one range of RSRP values or thresholds are RRC configured and/or indicated in downlink control information (DCI).

FE. The UE according to paragraph FB, wherein determining a timing value corresponding to the selected PUCCH resource further comprises: determining the timing value corresponding to a latest timing value provided by the serving node during a RRC connected state.

FF. The UE according to paragraph FB, wherein determining a timing value corresponding to the selected PUCCH resource further comprises: receiving, from the serving node, a timing offset between a global navigation satellite system (GNSS) timing and system frame or slot number or boundary; deriving a time stamp for a received downlink signal or channel; calculating a propagation delay according to the GNSS timing offset and the time stamp; and determining the timing value according to the propagation delay, wherein the GNSS timing offset is RRC configured or indicated in DCI.

FG. The UE according to paragraph EY, wherein the operations further comprise: determining a power level corresponding to the selected PUCCH resource; and transmitting the HARQ information report through the selected PUCCH resource according to the power level.

FH. The UE according to paragraph FG, wherein determining a power level corresponding to the selected PUCCH resource further comprises: receiving, from the serving node, at least one of a synchronization signal block (SSB) or a channel state information —reference signal (CSI-RS) and a transmitting power thereof; measuring a received power of the at least one of SSB or CSI-RS; calculating a pathloss according to at least the transmitting power and the received power of the at least one of SSB or CSI-RS; and determining the power level corresponding to the selected PUCCH resource according to at least the pathloss and a target received power, wherein the target received power is RRC configured or indicated in DCI by the serving node.

FI. The UE according to paragraph FG, wherein determining a power level corresponding to the selected PUCCH resource further comprises: receiving, from the serving node, a range of transmission power levels and a set of corresponding RSRP threshold values; measuring a reference signal received power level; and determining the power level corresponding to the selected PUCCH resource according to the measured reference signal received power level and the set of RSRP threshold values.

FJ. The UE according to paragraph FG, wherein determining a power level corresponding to the selected PUCCH resource further comprises: determining the power level corresponding to a latest power level provided by the serving node during a RRC connected state.

FK. The UE according to paragraph EW or EX, wherein the at least one PDSCH transport block received by the user equipment comprises two transport blocks, and the configured PUCCH allocation comprises three subsets of PUCCH resources, each subset of PUCCH resources being designated for transmitting the HARQ information report according to decoding status of the two transport blocks.

FL. The UE according to paragraph FK, wherein a first subset of PUCCH resources is designated for transmitting the HARQ information report indicating a first transport block being decoded erroneously; a second subset of PUCCH resources is designated for transmitting the HARQ information report indicating a second transport block being decoded erroneously; and a third subset of PUCCH resources is designated for transmitting the HARQ information report indicating the first transport block and the second transport block being decoded erroneously.

FM. The UE according to paragraph FK, wherein the operations further comprise: generating the HARQ information report including two bits that indicate the decoding status of the two transport blocks; determining a subset of PUCCH resources from the three subsets of PUCCH resources according to the decoding status of the two transport blocks; selecting one PUCCH resource from the determined subset of PUCCH resources; and transmitting, to the serving node, one among up to a SC count of possible cyclic shift hopping pseudo-random sequences representing the HARQ information report through the selected PUCCH resource.

FN. The UE according to paragraph FM, wherein the operations further comprise: determining a timing value corresponding to the selected PUCCH resource; and transmitting the HARQ information report through the selected PUCCH resource according to the timing value.

FO. The UE according to paragraph FN, wherein determining a timing value corresponding to the selected PUCCH resource further comprises: receiving, from the serving node, a synchronization signal block (SSB) and/or a physical downlink shared channel; and determining the timing value corresponding to the selected PUCCH resource according to a receive timing of the SSB and/or physical downlink shared channel.

FP. The UE according to paragraph FN, wherein determining a timing value corresponding to the selected PUCCH resource further comprises: receiving, from the serving node, a set of at least one timing value corresponding to a set of at least one range of reference signal received power (RSRP) values or thresholds; measuring a reference signal received power level; and determining the timing value corresponding to the selected PUCCH resource according to the measured reference signal received power level and the provided set of at least one range of reference signal received power values or thresholds.

FQ. The UE according to paragraph FN, wherein determining a timing value corresponding to the selected PUCCH resource further comprises: determining the timing value corresponding to a latest timing value provided by the serving node during a RRC connected state.

FR. The UE according to paragraph FN, wherein determining a timing value corresponding to the selected PUCCH resource further comprises: receiving, from the serving node, a timing offset between a global navigation satellite system (GNSS) timing and system frame or slot number or boundary; deriving a time stamp for a received downlink signal or channel; calculating a propagation delay according to the GNSS timing offset and the time stamp; and determining the timing value according to the propagation delay; wherein the GNSS timing offset is RRC configured or indicated in DCI.

FS. The UE according to paragraph FM, wherein the operations further comprise: determining a power level corresponding to the selected PUCCH resource; and transmitting the HARQ information report through the selected PUCCH resource according to the power level.

FT. The UE according to paragraph FS, wherein determining a power level corresponding to the selected PUCCH resource further comprises: receiving, from the serving node, at least one of a synchronization signal block (SSB) or a channel state information—reference signal (CSI-RS) and a transmitting power thereof; measuring a received power of the at least one of SSB or CSI-RS; calculating a pathloss according to at least the transmitting power and the received power of the at least one of SSB or CSI-RS; and determining the power level corresponding to the selected PUCCH resource according to at least the pathloss and a target received power; wherein the target received power is RRC configured or indicated in DCI by the serving node.

FU. The UE according to paragraph FS, wherein determining a power level corresponding to the selected PUCCH resource further comprises: receiving, from the serving node, a range of transmission power levels and a set of corresponding RSRP threshold levels; measuring a reference signal received power level; and determining the power level corresponding to the selected PUCCH resource according to the measured reference signal received power level and the set of RSRP threshold levels.

FV. The UE according to paragraph FS, wherein determining a power level corresponding to the selected PUCCH resource further comprises: determining the power level corresponding to a latest power level provided by the serving node during an RRC connected state.

FW. The UE according to paragraph EW or EX, wherein a PUCCH allocation to the UE configured at the serving node includes a set of PUCCH resources, a PUCCH resource of the PUCCH allocation comprising two resource blocks in a frequency domain and comprising at least one orthogonal frequency division multiplexing (OFDM) symbol in a time domain.

FX. The UE according to paragraph FW, wherein the at least one PDSCH transport block received by the user equipment comprises one transport block, the PUCCH allocation comprises a set of PUCCH resources, and the generated HARQ information report includes one bit that indicates a decoding status of the transport block; and performing NACK-only reporting comprises: selecting one PUCCH resource from the PUCCH allocation; and transmitting, to the serving node and via the even-numbered sub-carriers of the two transport blocks, one among up to a SC count of possible cyclic shift hopping pseudo-random sequences representing the HARQ information report through the selected PUCCH resource.

FY. The UE according to paragraph FX, wherein configured PUCCH count is less than the SC count, and one PUCCH resource outside of the PUCCH allocation is reserved as a reference resource.

FZ. The UE according to paragraph FX, wherein the selecting one PUCCH resource from the PUCCH allocation is based on random selection, based on at least a UE identifier, or based on an indication in downlink control information.

GA. The UE according to paragraph FX, wherein the operations further comprise: determining a timing value corresponding to the selected PUCCH resource; and transmitting the HARQ information report through the selected PUCCH resource according to the timing value.

GB. The UE according to paragraph GA, wherein determining a timing value corresponding to the selected PUCCH resource further comprises: receiving, from the serving node, a synchronization signal block (SSB) and/or a physical downlink shared channel; and determining the timing value corresponding to the selected PUCCH resource according to a receive timing of the SSB and/or physical downlink shared channel.

GC. The UE according to paragraph GA, wherein determining a timing value corresponding to the selected PUCCH resource further comprises: receiving, from the serving node, a set of at least one timing value corresponding to a set of at least one range of reference signal received power (RSRP) values or thresholds; measuring a reference signal received power level; and determining the timing value corresponding to the selected PUCCH resource according to the measured reference signal received power level and the provided set of at least one range of reference signal received power values or thresholds; wherein the provided set of at least one timing value corresponding to the set of at least one range of RSRP values or thresholds are RRC configured and/or indicated in downlink control information (DCI).

GD. The UE according to paragraph GA, wherein determining a timing value corresponding to the selected PUCCH resource further comprises: determining the timing value corresponding to a latest timing value provided by the serving node during a RRC connected state.

GE. The UE according to paragraph GA, wherein determining a timing value corresponding to the selected PUCCH resource further comprises: receiving, from the serving node, a timing offset between a global navigation satellite system (GNSS) timing and system frame or slot number or boundary; deriving a time stamp for a received downlink signal or channel; calculating a propagation delay according to the GNSS timing offset and the time stamp; and determining the timing value according to the propagation delay; wherein the GNSS timing offset is RRC configured or indicated in DCI.

GF. The UE according to paragraph FX, wherein the operations further comprise: determining a power level corresponding to the selected PUCCH resource; and transmitting the HARQ information report through the selected PUCCH resource according to the power level.

GG. The UE according to paragraph GF, wherein determining a power level corresponding to the selected PUCCH resource further comprises: receiving, from the serving node, at least one of a synchronization signal block (SSB) or a channel state information —reference signal (CSI-RS) and a transmitting power thereof; measuring a received power of the at least one of SSB or CSI-RS; calculating a pathloss according to at least the transmitting power and the received power of the at least one of SSB or CSI-RS; and determining the power level corresponding to the selected PUCCH resource according to at least the pathloss and a target received power; wherein the target received power is RRC configured or indicated in DCI by the serving node.

GH. The UE according to paragraph GF, wherein determining a power level corresponding to the selected PUCCH resource further comprises: receiving, from the serving node, a range of transmission power levels and a set of corresponding RSRP threshold values; measuring a reference signal received power level; and determining the power level corresponding to the selected PUCCH resource according to the measured reference signal received power level and the set of RSRP threshold values.

GI. The UE according to paragraph GF, wherein determining a power level corresponding to the selected PUCCH resource further comprises: determining the power level corresponding to a latest power level provided by the serving node during a RRC connected state.

GJ. The UE according to paragraph FW, wherein the at least one PDSCH transport block received by the user equipment comprises one transport block, the PUCCH allocation comprises a set of PUCCH resources, and the generated HARQ information report includes one bit that indicates a decoding status of the transport block; and performing NACK-only reporting comprises: selecting one PUCCH resource from the PUCCH allocation; and transmitting, to the serving node and via odd-numbered subcarriers of the two resource blocks, one among up to a SC count of possible cyclic shift hopping pseudo-random sequences representing the HARQ information report through the selected PUCCH resource.

GK. The UE according to paragraph GJ, wherein configured PUCCH count is less than the SC count, and one PUCCH resource outside of the PUCCH allocation is reserved as a reference resource.

GL. The UE according to paragraph GJ, wherein the selecting one PUCCH resource from the PUCCH allocation is based on random selection, based on at least a UE identifier, or based on an indication in downlink control information.

GM. The UE according to paragraph GJ, wherein the operations further comprise: determining a timing value corresponding to the selected PUCCH resource; and transmitting the HARQ information report through the selected PUCCH resource according to the timing value.

GN. The UE according to paragraph GM, wherein determining a timing value corresponding to the selected PUCCH resource further comprises: receiving, from the serving node, a synchronization signal block (SSB) and/or a physical downlink shared channel; and determining the timing value corresponding to the selected PUCCH resource according to a receive timing of the SSB and/or physical downlink shared channel.

GO. The UE according to paragraph GM, wherein determining a timing value corresponding to the selected PUCCH resource further comprises: receiving, from the serving node, a set of at least one timing value corresponding to a set of at least one range of reference signal received power (RSRP) values or thresholds; measuring a reference signal received power level; and determining the timing value corresponding to the selected PUCCH resource according to the measured reference signal received power level and the provided set of at least one range of reference signal received power values or thresholds; wherein the provided set of at least one timing value corresponding to the set of at least one range of RSRP values or thresholds are RRC configured and/or indicated in downlink control information (DCI).

GP. The UE according to paragraph GM, wherein determining a timing value corresponding to the selected PUCCH resource further comprises: determining the timing value corresponding to a latest timing value provided by the serving node during a RRC connected state.

GQ. The UE according to paragraph GM, wherein determining a timing value corresponding to the selected PUCCH resource further comprises: receiving, from the serving node, a timing offset between a global navigation satellite system (GNSS) timing and system frame or slot number or boundary; deriving a time stamp for a received downlink signal or channel; calculating a propagation delay according to the GNSS timing offset and the time stamp; and determining the timing value according to the propagation delay; wherein the GNSS timing offset is RRC configured or indicated in DCI.

GR. The UE according to paragraph GL, wherein the operations further comprise: determining a power level corresponding to the selected PUCCH resource; and transmitting the HARQ information report through the selected PUCCH resource according to the power level.

GS. The UE according to paragraph GR, wherein determining a power level corresponding to the selected PUCCH resource further comprises: receiving, from the serving node, at least one of a synchronization signal block (SSB) or a channel state information —reference signal (CSI-RS) and a transmitting power thereof; measuring a received power of the at least one of SSB or CSI-RS; calculating a pathloss according to at least the transmitting power and the received power of the at least one of SSB or CSI-RS; and determining the power level corresponding to the selected PUCCH resource according to at least the pathloss and a target received power; wherein the target received power is RRC configured or indicated in DCI by the serving node.

GT. The UE according to paragraph GR, wherein determining a power level corresponding to the selected PUCCH resource further comprises: receiving, from the serving node, a range of transmission power levels and a set of corresponding RSRP threshold values; measuring a reference signal received power level; and determining the power level corresponding to the selected PUCCH resource according to the measured reference signal received power level and the set of RSRP threshold values.

GU. The UE according to paragraph GR, wherein determining a power level corresponding to the selected PUCCH resource further comprises: determining the power level corresponding to a latest power level provided by the serving node during a RRC connected state.

GV. The UE according to paragraph FW, wherein the at least one PDSCH transport block received by the user equipment comprises two transport blocks, and the PUCCH allocation comprises three subsets of PUCCH resources, each subset of PUCCH resources being designated for transmitting the HARQ information report according to decoding status of the two transport blocks.

GW. The UE according to paragraph GV, wherein a first subset of PUCCH resources is designated for transmitting the HARQ information report indicating a first transport block being decoded erroneously; a second subset of PUCCH resources is designated for transmitting the HARQ information report indicating a second transport block being decoded erroneously, and a third subset of PUCCH resources is designated for transmitting the HARQ information report indicating the first transport block and the second transport block being decoded erroneously.

GX. The UE according to paragraph GV, wherein the operations further comprise: generating the HARQ information report including two bits that indicate the decoding status of the two transport blocks; determining a subset of PUCCH resources from the three subsets of PUCCH resources according to the decoding status of the two transport blocks; selecting one PUCCH resource from the determined subset of PUCCH resources; and transmitting, to the serving node and via the even-numbered sub-carriers of the two transport blocks, one among up to a possible SC count of cyclic shift hopping pseudo-random sequences representing the HARQ information report through the selected PUCCH resource.

GY. The UE according to paragraph GX, wherein the operations further comprise: determining a timing value corresponding to the selected PUCCH resource; and transmitting the HARQ information report through the selected PUCCH resource according to the timing value.

GZ. The UE according to paragraph GY, wherein determining a timing value corresponding to the selected PUCCH resource further comprises: receiving, from the serving node, a synchronization signal block (SSB) and/or a physical downlink shared channel; and determining the timing value corresponding to the selected PUCCH resource according to a receive timing of the SSB and/or physical downlink shared channel.

HA. The UE according to paragraph GY, wherein determining a timing value corresponding to the selected PUCCH resource further comprises: receiving, from the serving node, a set of at least one timing value corresponding to a set of at least one range of reference signal received power (RSRP) values or thresholds; measuring a reference signal received power level; and determining the timing value corresponding to the selected PUCCH resource according to the measured reference signal received power level and the provided set of at least one range of reference signal received power values or thresholds; wherein the provided set of at least one timing value corresponding to the set of at least one range of RSRP values or thresholds are RRC configured and/or indicated in downlink control information (DCI).

HB. The UE according to paragraph GY, wherein determining a timing value corresponding to the selected PUCCH resource further comprises: determining the timing value corresponding to a latest timing value provided by the serving node during a RRC connected state.

HC. The UE according to paragraph GY, wherein determining a timing value corresponding to the selected PUCCH resource further comprises: receiving, from the serving node, a timing offset between a global navigation satellite system (GNSS) timing and system frame or slot number or boundary; deriving a time stamp for a received downlink signal or channel; calculating a propagation delay according to the GNSS timing offset and the time stamp; and determining the timing value according to the propagation delay; wherein the GNSS timing offset is RRC configured or indicated in DCI.

HD. The UE according to paragraph GX, wherein the operations further comprise: determining a power level corresponding to the selected PUCCH resource; and transmitting the HARQ information report through the selected PUCCH resource according to the power level.

HE. The UE according to paragraph HD, wherein determining a power level corresponding to the selected PUCCH resource further comprises: receiving, from the serving node, at least one of a synchronization signal block (SSB) or a channel state information —reference signal (CSI-RS) and a transmitting power thereof; measuring a received power of the at least one of SSB or CSI-RS; calculating a pathloss according to at least the transmitting power and the received power of the at least one of SSB or CSI-RS; and determining the power level corresponding to the selected PUCCH resource according to at least the pathloss and a target received power; wherein the target received power is RRC configured or indicated in DCI by the serving node.

HF. The UE according to paragraph HD, wherein determining a power level corresponding to the selected PUCCH resource further comprises: receiving, from the serving node, a range of transmission power levels and a set of corresponding RSRP threshold values; measuring a reference signal received power level; and determining the power level corresponding to the selected PUCCH resource according to the measured reference signal received power level and the set of RSRP threshold values.

HG. The UE according to paragraph HD, wherein determining a power level corresponding to the selected PUCCH resource further comprises: determining the power level corresponding to a latest power level provided by the serving node during a RRC connected state.

HH. The UE according to paragraph FW, wherein the at least one PDSCH transport block received by the user equipment comprises two transport blocks, and the configured PUCCH allocation comprises three subsets of PUCCH resources, each subset of PUCCH resources being designated for transmitting the HARQ information report according to decoding status of the two transport blocks.

HI. The UE according to paragraph HH, wherein a first subset of PUCCH resources is designated for transmitting the HARQ information report indicating a first transport block being decoded erroneously; a second subset of PUCCH resources is designated for transmitting the HARQ information report indicating a second transport block being decoded erroneously, and a third subset of PUCCH resources is designated for transmitting the HARQ information report indicating the first transport block and the second transport block being decoded erroneously.

HJ. The UE according to paragraph HH, wherein the operations further comprise: generating the HARQ information report including two bits that indicate the decoding status of the two transport blocks; determining a subset of PUCCH resources from the three subsets of PUCCH resources according to the decoding status of the two transport blocks; selecting one PUCCH resource from the determined subset of PUCCH resources; and transmitting, to the serving node and via odd-numbered sub-carriers of the two transport blocks, one among up to a SC count of possible cyclic shift hopping pseudo-random sequences representing the HARQ information report through the selected PUCCH resource.

HK. The UE according to paragraph HJ, wherein the operations further comprise: determining a timing value corresponding to the selected PUCCH resource; and transmitting the HARQ information report through the selected PUCCH resource according to the timing value.

HL. The UE according to paragraph HK, wherein determining a timing value corresponding to the selected PUCCH resource further comprises: receiving, from the serving node, a synchronization signal block (SSB) in a physical downlink shared channel; and determining the timing value corresponding to the selected PUCCH resource according to a receive timing of the SSB and/or physical downlink shared channel.

HM. The UE according to paragraph HK, wherein determining a timing value corresponding to the selected PUCCH resource further comprises: receiving, from the serving node, a set of at least one timing value corresponding to a set of at least one range of reference signal received power (RSRP) values or thresholds; measuring a reference signal received power level; and determining the timing value corresponding to the selected PUCCH resource according to the measured reference signal received power level and the provided set of at least one range of reference signal received power values or thresholds; wherein the provided set of at least one timing value corresponding to a set of at least one range of RSRP values or thresholds are RRC configured and/or indicated in downlink control information (DCI).

HN. The UE according to paragraph HK, wherein determining a timing value corresponding to the selected PUCCH resource further comprises: determining the timing value corresponding to a latest timing value provided by the serving node during a RRC connected state.

HO. The UE according to paragraph HL, wherein determining a timing value corresponding to the selected PUCCH resource further comprises: receiving, from the serving node, a timing offset between a global navigation satellite system (GNSS) timing and system frame or slot number or boundary; deriving a time stamp for a received downlink signal or channel; calculating a propagation delay according to the GNSS timing offset and the time stamp; and determining the timing value according to the propagation delay; wherein the GNSS timing offset is RRC configured or indicated in DCI.

HP. The UE according to paragraph HJ, wherein the operations further comprise: determining a power level corresponding to the selected PUCCH resource; and transmitting the HARQ information report through the selected PUCCH resource according to the power level.

HQ. The UE according to paragraph HP, wherein determining a power level corresponding to the selected PUCCH resource further comprises: receiving, from the serving node, at least one of a synchronization signal block (SSB) or a channel state information —reference signal (CSI-RS) and a transmitting power thereof; measuring a received power of the at least one of SSB or CSI-RS; calculating a pathloss according to at least the transmitting power and the received power of the at least one of SSB or CSI-RS; and determining the power level corresponding to the selected PUCCH resource according to at least the pathloss and a target received power; wherein the target received power is RRC configured or indicated in DCI by the serving node.

HR. The UE according to paragraph HP, wherein determining a power level corresponding to the selected PUCCH resource further comprises: receiving, from the serving node, a range of transmission power levels and a set of corresponding RSRP threshold values; measuring a reference signal received power level; and determining the power level corresponding to the selected PUCCH resource according to the measured reference signal received power level and the set of RSRP threshold values.

HS. The UE according to paragraph HP, wherein determining a power level corresponding to the selected PUCCH resource further comprises: determining the power level corresponding to a latest power level provided by the serving node during a RRC connected state.

HT. A method implemented by a serving node, the method comprising: transmitting, to a user equipment (UE) and via a new radio (NR) radio access network (RAN), at least one physical downlink shared channel (PDSCH) transport block; receiving, from the UE, a hybrid automatic repeat request (HARQ) information report indicating a negative acknowledgement (NACK) of a first PDSCH transport block, the first PDSCH transport block being decoded erroneously during a UE radio resource control (RRC) idle state or a UE RRC inactive state; and retransmitting, to the UE, the first PDSCH transport block.

HU. The method according to paragraph HT, further comprising: providing, to the UE, a physical uplink control channel (PUCCH) allocation for performing NACK-only reporting, the PUCCH allocation including a PUCCH resource or a set of PUCCH resources numbered at a configured PUCCH count, and a PUCCH resource of the PUCCH allocation comprising at least one resource block in a frequency domain and comprising at least one orthogonal frequency division multiplexing (OFDM) symbol in a time domain, the resource block comprising a plurality of subcarriers (SCs) numbered at a SC count, wherein the configured PUCCH count is less than the SC count.

HV. The method according to paragraph HU, further comprising: reserving one PUCCH resource outside of the PUCCH allocation as a reference resource.

HW. The method according to paragraph HU, further comprising: indicating, to the UE and in downlink control information (DCI), a PUCCH resource from the PUCCH allocation to be selected for performing NACK-only reporting; and receiving, from the UE and via the PUCCH resource, the HARQ information report indicating NACK of the first PDSCH transport block.

HX. The method according to paragraph HW, further comprising: transmitting, to the UE, at least one of a synchronization signal block (SSB) or a physical downlink shared channel for determining a time value corresponding to the PUCCH resource.

HY. The method according to paragraph HW, further comprising: transmitting, to the UE, a set of at least one timing value corresponding to a set of at least one range of reference signal received power (RSRP) values or thresholds for determining a time value corresponding to the PUCCH resource, wherein the set of at least one timing value corresponding to the set of at least one range of RSRP values or thresholds are radio resource control (RRC) configured and/or indicated in the downlink control information (DCI).

HZ. The method according to paragraph HW, further comprising: transmitting, to the UE, a timing offset between a global navigation satellite system (GNSS) timing and system frame or slot number or boundary for determining a time value corresponding to the PUCCH resource.

IA. The method according to any one of paragraphs HX, HY, or HZ, further comprising: receiving, from the UE and via the PUCCH resource, the HARQ information report indicating NACK of the first PDSCH transport block according to the timing value.

IB. The method according to paragraph HW, further comprising: transmitting, to the UE, at least one of a synchronization signal block (SSB) or a channel state information—reference signal (CSI-RS) and a transmitting power thereof for determining a power level corresponding to the PUCCH resource.

IC. The method according to paragraph HW, further comprising: transmitting, to the UE, a range of transmission power levels and a set of corresponding RSRP threshold values for determining a power level corresponding to the PUCCH resource.

ID. The method according to any one of paragraphs IB or IC, further comprising: receiving, from the UE and via the PUCCH resource, the HARQ information report indicating NACK of the first PDSCH transport block according to the power level.

IE. One or more computer readable media storing thereon computer-readable instructions that, when executed by one or more processors of a serving node cause the one or more processors to perform operations, the operations comprising: transmitting, to a user equipment (UE) and via a new radio (NR) radio access network (RAN), at least one physical downlink shared channel (PDSCH) transport block; receiving, from the UE, a hybrid automatic repeat request (HARQ) information report indicating a negative acknowledgement (NACK) of a first PDSCH transport block, the first PDSCH transport block being decoded erroneously during a UE radio resource control (RRC) idle state or a UE RRC inactive state; and retransmitting, to the UE, the first PDSCH transport block.

IF. The one or more computer readable media according to paragraph IE, wherein the operations further comprise: providing, to the UE, a physical uplink control channel (PUCCH) allocation for performing NACK-only reporting, the PUCCH allocation including a PUCCH resource or a set of PUCCH resources numbered at a configured PUCCH count, and a PUCCH resource of the PUCCH allocation comprising at least one resource block in a frequency domain and comprising at least one orthogonal frequency division multiplexing (OFDM) symbol in a time domain, the resource block comprising a plurality of sub-carriers (SCs) numbered at a SC count, wherein the configured PUCCH count is less than the SC count.

IG. The one or more computer readable media according to paragraph IF, wherein the operations further comprise: reserving one PUCCH resource outside of the PUCCH allocation as a reference resource.

IH. The one or more computer readable media according to paragraph IF, wherein the operations further comprise: indicating, to the UE and in downlink control information (DCI), a PUCCH resource from the PUCCH allocation to be selected for performing NACK-only reporting; and receiving, from the ULE and via the PUCCH resource, the HARQ information report indicating NACK of the first PDSCH transport block.

II. The one or more computer readable media according to paragraph IF, wherein the operations further comprise: transmitting, to the UE, at least one of a synchronization signal block (SSB) or a physical downlink shared channel for determining a time value corresponding to the PUCCH resource.

IJ. The one or more computer readable media according to paragraph IF, wherein the operations further comprise: transmitting, to the UE, a set of at least one timing value corresponding to a set of at least one range of reference signal received power (RSRP) values or thresholds for determining a time value corresponding to the PUCCH resource, wherein the set of at least one timing value corresponding to the set of at least one range of RSRP values or thresholds are radio resource control (RRC) configured and/or indicated in the downlink control information (DCI).

IK. The one or more computer readable media according to paragraph IF, wherein the operations further comprise: transmitting, to the UE, a timing offset between a global navigation satellite system (GNSS) timing and system frame or slot number or boundary for determining a time value corresponding to the PUCCH resource.

IL. The one or more computer readable media according to any one of paragraphs II, IJ, or IK, wherein the operations further comprise: receiving, from the UE and via the PUCCH resource, the HARQ information report indicating NACK of the first PDSCH transport block according to the timing value.

IM. The one or more computer readable media according to paragraph IF, wherein the operations further comprise: transmitting, to the UE, at least one of a synchronization signal block (SSB) or a channel state information—reference signal (CSI-RS) and a transmitting power thereof for determining a power level corresponding to the PUCCH resource.

IN. The one or more computer readable media according to paragraph IF, wherein the operations further comprise: transmitting, to the UE, a range of transmission power levels and a set of corresponding RSRP threshold values for determining a power level corresponding to the PUCCH resource.

IO. The one or more computer readable media according to any one of paragraphs IM or IN, wherein the operations further comprise: receiving, from the UE and via the PUCCH resource, the HARQ information report indicating NACK of the first PDSCH transport block according to the power level.

IP. A serving node comprising: one or more processors; and memory coupled to the one or more processors, the memory storing thereon computer-readable instructions that, when executed by the one or more processors, cause the one or more processors to perform operations, the operations comprising: transmitting, to a user equipment (UE) and via a new radio (NR) radio access network (RAN), at least one physical downlink shared channel (PDSCH) transport block; receiving, from the UE, a hybrid automatic repeat request (HARQ) information report indicating a negative acknowledgement (NACK) of a first PDSCH transport block, the first PDSCH transport block being decoded erroneously during a UE radio resource control (RRC) idle state or a UE RRC inactive state; and retransmitting, to the UE, the first PDSCH transport block.

IQ. The serving node according to paragraph IP, wherein the operations further comprise: providing, to the UE, a physical uplink control channel (PUCCH) allocation for performing NACK-only reporting, the PUCCH allocation including a PUCCH resource or a set of PUCCH resources numbered at a configured PUCCH count, and a PUCCH resource of the PUCCH allocation comprising one resource block in a frequency domain and comprising at least one orthogonal frequency division multiplexing (OFDM) symbol in a time domain, the resource block comprising a plurality of sub-carriers (SCs) numbered at a SC count, wherein the configured PUCCH count is less than the SC count; and reserving one PUCCH resource outside of the PUCCH allocation as a reference resource.

IR. The serving node according to paragraph IQ, wherein the operations further comprise reserving one PUCCH resource outside of the PUCCH allocation as a reference resource.

IS. The serving node according to paragraph IQ, wherein the operations further comprise: indicating, to the UE and in downlink control information (DCI), one PUCCH resource from the PUCCH allocation to be selected for performing NACK-only reporting; and receiving, from the UE and via the PUCCH resource, the HARQ information report indicating NACK of the first PDSCH transport block.

IT. The serving node according to paragraph IQ, wherein the operations further comprise: transmitting, to the UE, at least one of a synchronization signal block (SSB) or a physical downlink shared channel for determining a time value corresponding to the PUCCH resource.

IU. The serving node according to paragraph IQ, wherein the operations further comprise: transmitting, to the UE, a set of at least one timing value corresponding to a set of at least one range of reference signal received power (RSRP) values or thresholds for determining a time value corresponding to the PUCCH resource, wherein the set of at least one timing value corresponding to the set of at least one range of RSRP values or thresholds are radio resource control (RRC) configured and/or indicated in the downlink control information (DCI).

IV. The serving node according to paragraph IQ, wherein the operations further comprise: transmitting, to the UE, a timing offset between a global navigation satellite system (GNSS) timing and system frame or slot number or boundary for determining a time value corresponding to the PUCCH resource.

IW. The serving node according to any one of paragraphs IT, IU, or IV, wherein the operations further comprise: receiving, from the UE and via the PUCCH resource, the HARQ information report indicating NACK of the first PDSCH transport block according to the timing value.

IX. The serving node according to paragraph IQ, wherein the operations further comprise: transmitting, to the UE, at least one of a synchronization signal block (SSB) or a channel state information—reference signal (CSI-RS) and a transmitting power thereof for determining a power level corresponding to the PUCCH resource.

IY. The serving node according to paragraph IQ, wherein the operations further comprise: transmitting, to the UE, a range of transmission power levels and a set of corresponding RSRP threshold values for determining a power level corresponding to the PUCCH resource.

IZ. The serving node according to any one of paragraphs IX or IY, wherein the operations further comprise: receiving, from the ULE and via the PUCCH resource, the HARQ information report indicating NACK of the first PDSCH transport block according to the power level.

What is claimed is:

1. A method implemented by a user equipment (UE), the method comprising:

receiving, from a serving node and via a new radio (NR) radio access network (RAN), at least one physical downlink shared channel (PDSCH) transport block;

determining that a first PDSCH transport block is decoded erroneously during a UE radio resource control (RRC) idle state or a UE RRC inactive state;

generating a hybrid automatic repeat request (HARQ) information report indicating a negative acknowledgement (NACK) of the first PDSCH transport block;

performing NACK-only reporting to the serving node;

determining that a second PDSCH transport block is decoded correctly during the UE RRC idle state or the UE RRC inactive state; and determining an absence of transmitting a HARQ information report indicating an acknowledgement (ACK) of the second PDSCH transport block;

wherein performing the NACK-only reporting comprises:

selecting a PUCCH resource from a PUCCH allocation;

generating a pseudo-random sequence, wherein a length of the pseudo-random sequence is equal to a total number N of sub-carriers of one RB of the selected PUCCH resource;

performing cyclic shifts upon the generated pseudo-random sequence to derive N cyclic shift hopping pseudo-random sequences of different offsets;

mapping N elements of each of the N cyclic shift hopping pseudo-random sequences to a the N sub-carriers of a same RB of the selected PUCCH resource to obtain N effective PUCCH resources corresponding to the same RB; and transmitting M NACK-only reports at the same time by using M of the N effective PUCCH resources corresponding to the same RB of the selected PUCCH resource, wherein M is an integer greater than 1 and less than or equal to N.

2. The method of claim 1, wherein a physical uplink control channel (PUCCH) allocation to the UE configured at the serving node includes a PUCCH resource or a set of PUCCH resources numbered at a configured PUCCH count, a PUCCH resource of the PUCCH allocation comprising one resource block in a frequency domain and comprising at least one orthogonal frequency division multiplexing (OFDM) symbol in a time domain, the resource block comprising a plurality of sub-carriers (SCs) numbered at a SC count.

3. The method of claim 2, wherein the at least one PDSCH transport block received by the user equipment comprises one transport block, the PUCCH allocation comprises a set of PUCCH resources, and the generated HARQ information report includes one bit that indicates a decoding status of the transport block;

one PUCCH resource outside of the PUCCH allocation is reserved as a reference resource, the reference resource is configured to be not selectable by any UE to transmit the HARQ information report and is used to provide a reference energy level for comparing with energy level of a PUCCH resource that is selectable by UEs for transmitting HARQ information report.

4. The method of claim 3, further comprising:

determining a timing value corresponding to the selected PUCCH resource; and transmitting the HARQ information report through the selected PUCCH resource according to the timing value.

5. The method of claim 4, wherein determining a timing value corresponding to the selected PUCCH resource further comprises:

receiving, from the serving node, a synchronization signal block (SSB) and/or a physical downlink shared channel; and determining the timing value corresponding to the selected PUCCH resource according to a receive timing of the SSB and/or physical downlink shared channel; or determining a timing value corresponding to the selected PUCCH resource further comprises:

receiving, from the serving node, a set of at least one timing value corresponding to a set of at least one range of reference signal received power (RSRP) values or thresholds;

measuring a reference signal received power level; and determining the timing value corresponding to the selected PUCCH resource according to the measured reference signal received power level and the provided set of at least one range of reference signal received power values or thresholds;

wherein the provided set of at least one timing value corresponding to the set of at least one range of RSRP values or thresholds are RRC configured and/or indicated in downlink control information (DCI); or
determining a timing value corresponding to the selected PUCCH resource further comprises:
determining the timing value corresponding to a latest timing value provided by the serving node during a RRC connected state; or
determining a timing value corresponding to the selected PUCCH resource further comprises:
receiving, from the serving node, a timing offset between a global navigation satellite system (GNSS) timing and system frame or slot number or boundary;
deriving a time stamp for a received downlink signal or channel;
calculating a propagation delay according to the GNSS timing offset and the time stamp; and
determining the timing value according to the propagation delay,
wherein the GNSS timing offset is RRC configured or indicated in DCI.

6. The method of claim 3, further comprising:
determining a power level corresponding to the selected PUCCH resource; and
transmitting the HARQ information report through the selected PUCCH resource according to the power level.

7. The method of claim 6, wherein determining a power level corresponding to the selected PUCCH resource further comprises:
receiving, from the serving node, at least one of a synchronization signal block (SSB) or a channel state information-reference signal (CSI-RS) and a transmitting power thereof;
measuring a received power of the at least one of SSB or CSI-RS;
calculating a pathloss according to at least the transmitting power and the received power of the at least one of SSB or CSI-RS; and
determining the power level corresponding to the selected PUCCH resource according to at least the pathloss and a target received power,
wherein the target received power is RRC configured or indicated in DCI by the serving node; or
determining a power level corresponding to the selected PUCCH resource further comprises:
receiving, from the serving node, a range of transmission power levels and a set of corresponding RSRP threshold values;
measuring a reference signal received power level; and
determining the power level corresponding to the selected PUCCH resource according to the measured reference signal received power level and the set of RSRP threshold values; or
determining a power level corresponding to the selected PUCCH resource further comprises:
determining the power level corresponding to a latest power level provided by the serving node during a RRC connected state.

8. The method of claim 7, further comprising:
generating the HARQ information report including two bits that indicate the decoding status of the two transport blocks;
determining a subset of PUCCH resources from the three subsets of PUCCH resources according to the decoding status of the two transport blocks;
selecting one PUCCH resource from the determined subset of PUCCH resources; and transmitting, to the serving node, one among up to a SC count of possible cyclic shift hopping pseudo-random sequences representing the HARQ information report through the selected PUCCH resource.

9. The method of claim 1, wherein the at least one PDSCH transport block received by the user equipment comprises two transport blocks, and the configured PUCCH allocation comprises three non-overlapping subsets of PUCCH resources, the three non-overlapping subsets of PUCCH resources being respectively designated for transmitting different HARQ information reports indicating different decoding statuses of the two transport blocks.

10. The method of claim 9, wherein the two transport blocks including a first transport block and a second transport block, a first subset of the three non-overlapping subsets of PUCCH resources is designated for only transmitting the HARQ information report indicating the first transport block being decoded erroneously;
a second subset of the three non-overlapping subsets of PUCCH resources is designated for only transmitting the HARQ information report indicating the second transport block being decoded erroneously; and
a third subset of the three non-overlapping subsets of PUCCH resources is designated for only transmitting the HARQ information report indicating the first transport block and the second transport block being decoded erroneously.

11. A user equipment (UE) comprising:
one or more processors; and
memory coupled to the one or more processors, the memory storing thereon computer-readable instructions that, when executed by the one or more processors, cause the one or more processors to perform operations, the operations comprising:
receiving, from a serving node and via a new radio (NR) radio access network (RAN), at least one physical downlink shared channel (PDSCH) transport block;
determining that a first PDSCH transport block is decoded erroneously during a UE radio resource control (RRC) idle state or a UE RRC inactive state;
generating a hybrid automatic repeat request (HARQ) information report indicating a negative acknowledgement (NACK) of the first PDSCH transport block;
performing NACK-only reporting to the serving node;
determining that a second PDSCH transport block is decoded correctly during the UE RRC idle state or the UE RRC inactive state; and
determining an absence of transmitting a HARQ information report indicating an acknowledgement (ACK) of the second PDSCH transport block;
wherein performing the NACK-only reporting comprises:
selecting a PUCCH resource from a PUCCH allocation;
generating a pseudo-random sequence, wherein a length of the pseudo-random sequence is equal to a total number N of sub-carriers of one RB of the selected PUCCH resource;
performing cyclic shifts upon the generated pseudo-random sequence to derive N cyclic shift hopping pseudo-random sequences of different offsets;
mapping N elements of each of the N cyclic shift hopping pseudo-random sequences to the N sub-carriers of a same RB of the selected PUCCH resource to obtain N effective PUCCH resources corresponding to the same RB; and transmitting M NACK-only reports at the same time by using M of the N effective PUCCH resources corresponding to the same RB of the selected PUCCH resource, wherein M is an integer greater than 1 and less than or equal to N.

12. A method implemented by a serving node, the method comprising:

transmitting, to a user equipment (UE) and via a new radio (NR) radio access network (RAN), at least one physical downlink shared channel (PDSCH) transport block;

receiving, from the UE, a hybrid automatic repeat request (HARQ) information report indicating a negative acknowledgement (NACK) of a first PDSCH transport block, the first PDSCH transport block being decoded erroneously during a UE radio resource control (RRC) idle state or a UE RRC inactive state;

retransmitting, to the UE, the first PDSCH transport block; and providing, to the UE, a physical uplink control channel (PUCCH) allocation for performing NACK-only reporting, wherein retransmitting, to the UE, the first PDSCH transport block; and transmitting a HARQ information report indicating an acknowledgement (ACK) of a second PDSCH transport block for correctly decoding is absent during the UE RRC idle state or the UE RRC inactive state;

wherein performing the NACK-only reporting comprises:

selecting a PUCCH resource from the PUCCH allocation;

generating a pseudo-random sequence, wherein a length of the pseudo-random sequence is equal to a total number N of sub-carriers of one RB of the selected PUCCH resource;

performing cyclic shifts upon the generated pseudo-random sequence to derive N cyclic shift hopping pseudo-random sequences of different offsets;

mapping N elements of each of the N cyclic shift hopping pseudo-random sequences to the N sub-carriers of a same RB of the selected PUCCH resource to obtain N effective PUCCH resources corresponding to the same RB; and transmitting M NACK-only reports at the same time by using M of the N effective PUCCH resources corresponding to the same RB of the selected PUCCH resource, wherein M is an integer greater than 1 and less than or equal to N.

13. The method of claim 12, wherein:

the PUCCH allocation including a PUCCH resource or a set of PUCCH resources numbered at a configured PUCCH count, and a PUCCH resource of the PUCCH allocation comprising at least one resource block in a frequency domain and comprising at least one orthogonal frequency division multiplexing (OFDM) symbol in a time domain, the resource block comprising a plurality of sub-carriers (SCs) numbered at a SC count, wherein the configured PUCCH count is less than the SC count.

14. The method of claim 13, further comprising:

reserving one PUCCH resource outside of the PUCCH allocation as a reference resource, the reference resource is configured to be not selectable by any UE to transmit the HARQ information report and is used to provide a reference energy level for comparing with energy level of a PUCCH resource that is selectable by UEs for transmitting HARQ information report.

15. The method of claim 13, further comprising:

indicating, to the UE and in downlink control information (DCI), a PUCCH resource from the PUCCH allocation to be selected for performing NACK-only reporting; and receiving, from the UE and via the PUCCH resource, the HARQ information report indicating NACK of the first PDSCH transport block.

16. The method of claim 15, further comprising:

transmitting, to the UE, at least one of a synchronization signal block (SSB) or a physical downlink shared channel for determining a time value corresponding to the PUCCH resource; or transmitting, to the UE, a set of at least one timing value corresponding to a set of at least one range of reference signal received power (RSRP) values or thresholds for determining a time value corresponding to the PUCCH resource, wherein the set of at least one timing value corresponding to the set of at least one range of RSRP values or thresholds are radio resource control (RRC) configured and/or indicated in the downlink control information (DCI); or transmitting, to the UE, a timing offset between a global navigation satellite system (GNSS) timing and system frame or slot number or boundary for determining a time value corresponding to the PUCCH resource.

17. The method of claim 16, further comprising:

receiving, from the UE and via the PUCCH resource, the HARQ information report indicating NACK of the first PDSCH transport block according to the timing value.

18. The method of claim 16, further comprising:

receiving, from the UE and via the PUCCH resource, the HARQ information report indicating NACK of the first PDSCH transport block according to the power level.

19. The method of claim 15, further comprising:

transmitting, to the UE, at least one of a synchronization signal block (SSB) or a channel state information-reference signal (CSI-RS) and a transmitting power thereof for determining a power level corresponding to the PUCCH resource; or transmitting, to the UE, a range of transmission power levels and a set of corresponding RSRP threshold values for determining a power level corresponding to the PUCCH resource.

* * * * *